United States Patent
Jordan et al.

(10) Patent No.: US 12,446,719 B1
(45) Date of Patent: *Oct. 21, 2025

(54) PARCEL SAFE SYSTEM

(71) Applicant: Parcel Safe Systems LLC, Tulsa, OK (US)

(72) Inventors: Kip Jordan, Tulsa, OK (US); Steven Killman, Tulsa, OK (US); Ed Conn, Tulsa, OK (US); Philip M. Maltby, Sand Springs, OK (US)

(73) Assignee: Parcel Safe Systems LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,192

(22) Filed: Jul. 12, 2023

Related U.S. Application Data

(63) Continuation-in-part of application No. 17/510,827, filed on Oct. 26, 2021, now Pat. No. 11,889,938.

(60) Provisional application No. 63/105,569, filed on Oct. 26, 2020.

(51) Int. Cl.
*A47G 29/20* (2006.01)
*A47G 29/14* (2006.01)

(52) U.S. Cl.
CPC ........... *A47G 29/141* (2013.01); *A47G 29/20* (2013.01); *A47G 2029/146* (2013.01); *A47G 2029/149* (2013.01)

(58) Field of Classification Search
None
See application file for complete search history.

(56) References Cited

U.S. PATENT DOCUMENTS

| | | | |
|---|---|---|---|
| 6,130,822 A | 10/2000 | Della Fiora et al. | |
| 10,043,332 B2 | 8/2018 | Scalisi et al. | |
| 10,074,067 B2 | 9/2018 | Klingenberg et al. | |
| 10,131,478 B2 | 11/2018 | Maser | |
| 10,361,880 B1 | 7/2019 | Marcinkowski et al. | |
| 10,482,420 B1 | 11/2019 | Brooks et al. | |
| 11,410,118 B2 * | 8/2022 | Fee | G07C 9/00896 |
| 11,478,099 B1 * | 10/2022 | Bates | A47G 29/141 |
| 11,889,938 B2 * | 2/2024 | Jordan | A47G 29/141 |
| 2004/0216650 A1 | 11/2004 | Lee et al. | |
| 2004/0222006 A1 | 11/2004 | Gerardo | |
| 2015/0120601 A1 | 4/2015 | Fee | |
| 2015/0154549 A1 | 6/2015 | Skaaksrud | |

(Continued)

FOREIGN PATENT DOCUMENTS

EP 2881905 6/2015

OTHER PUBLICATIONS

Boxillion compound box; http://www.boxillion.com/en/solutions.

(Continued)

*Primary Examiner* — K. Wong
(74) *Attorney, Agent, or Firm* — Head, Johnson, Kachigian & Wilkinson, PC

(57) ABSTRACT

A parcel safe system comprising a parcel safe in communication with a server, providing remote access and control of the system. The parcel safe system may be integrated into a home or building structure itself, significantly reducing the risk of package theft. The parcel safe system may use modular construction, allowing for customization, and may incorporate smart home technology. The parcel safe system may provide a controlled environment, suitable for temporary storage of groceries and prescriptions.

11 Claims, 25 Drawing Sheets

(56) References Cited

U.S. PATENT DOCUMENTS

| | | |
|---|---|---|
| 2015/0339872 A1 | 11/2015 | de Puiseau |
| 2016/0189454 A1 | 6/2016 | Johnson et al. |
| 2017/0143146 A1 | 5/2017 | Charbeneau |
| 2017/0286905 A1 | 10/2017 | Richardson et al. |
| 2019/0259232 A1 | 8/2019 | Nandakumar |
| 2019/0327107 A1 | 10/2019 | Marcinkowski et al. |
| 2019/0327448 A1 | 10/2019 | Fu et al. |
| 2019/0333304 A1 | 10/2019 | Flynn et al. |
| 2019/0350398 A1 | 11/2019 | Raphael et al. |
| 2019/0362576 A1 | 11/2019 | Messina |
| 2021/0079720 A1 | 3/2021 | Hunt |

OTHER PUBLICATIONS

Edelstahl Briefkasten; https://www.briefkasten-manufaktur.de/edelstahl-briefkasten-big-gira-system106-video-komplettset-515-b-ksapgi106.html.

Florence 1590 Series 4—Parcel Lockers on Pedestal; https://www.florencemailboxes.com/valiant-outdoor-parcel-lockers.

Door https://www.doorbox.co/ https://www.kickstarter.com/projects/idoorbox/idoorbox-the-worlds-first-secure-package-delivery-box.

Panasonic "Combo" parcel delivery box.

Smart Lock/Locker http://www.mysinglelink.com/Index_Product_Locker.cfm.

Smart Post Parcel Mailbox Delivery Electronic Locker for Home or Online Shopping Use https://www.winnsen.com/supplier-99582-parcel-delivery-lockers.

International Search Report and Written Opinion International PCT Application Serial No. PCT/US21/56604, Korean Intellectual Property Office, Feb. 15, 2022.

* cited by examiner

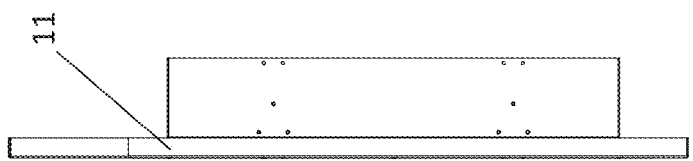
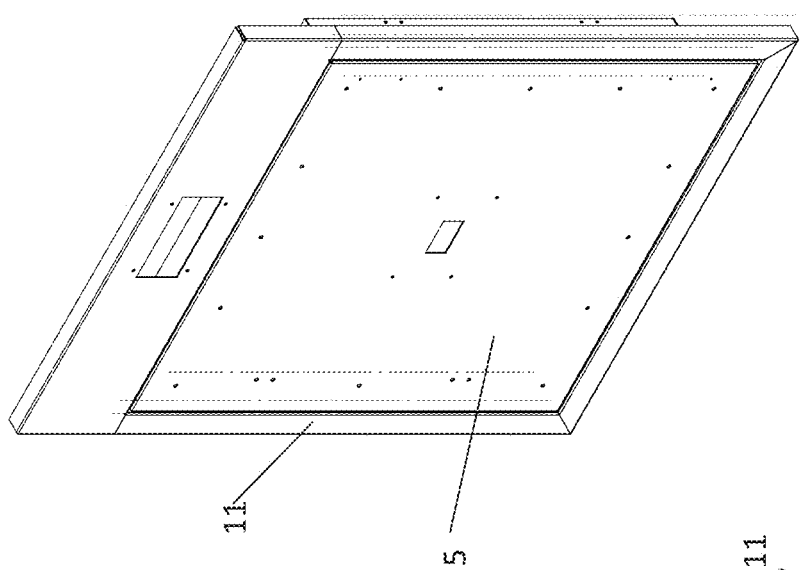
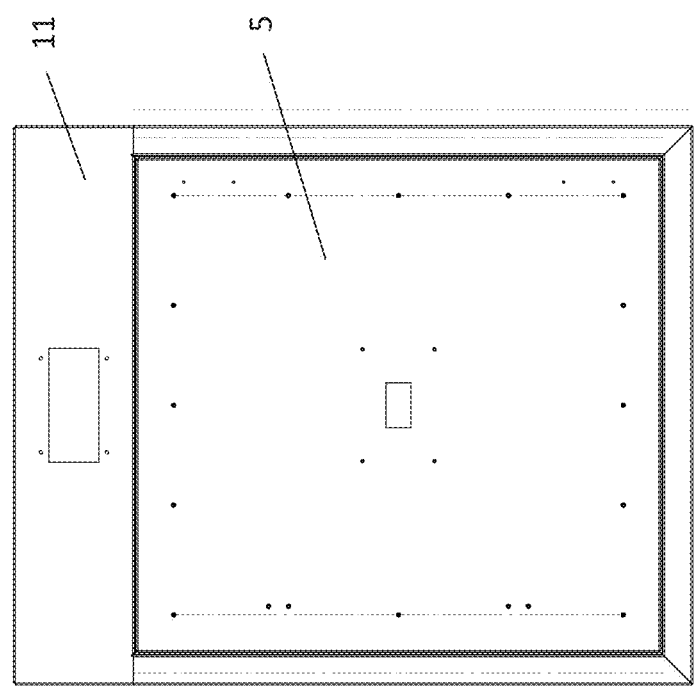
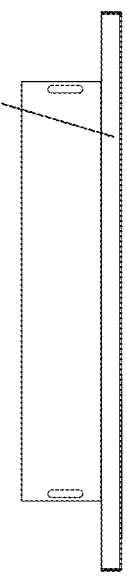

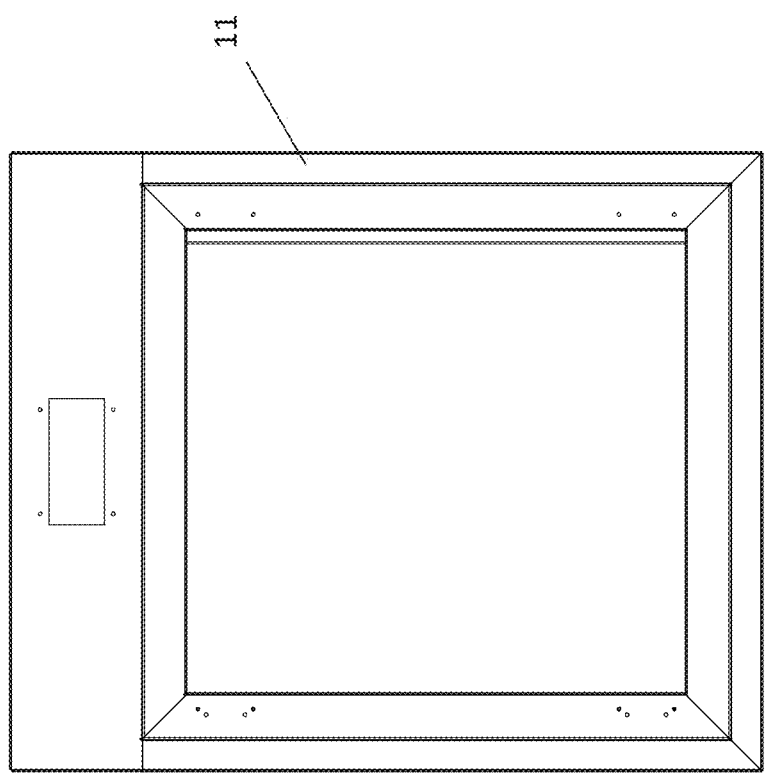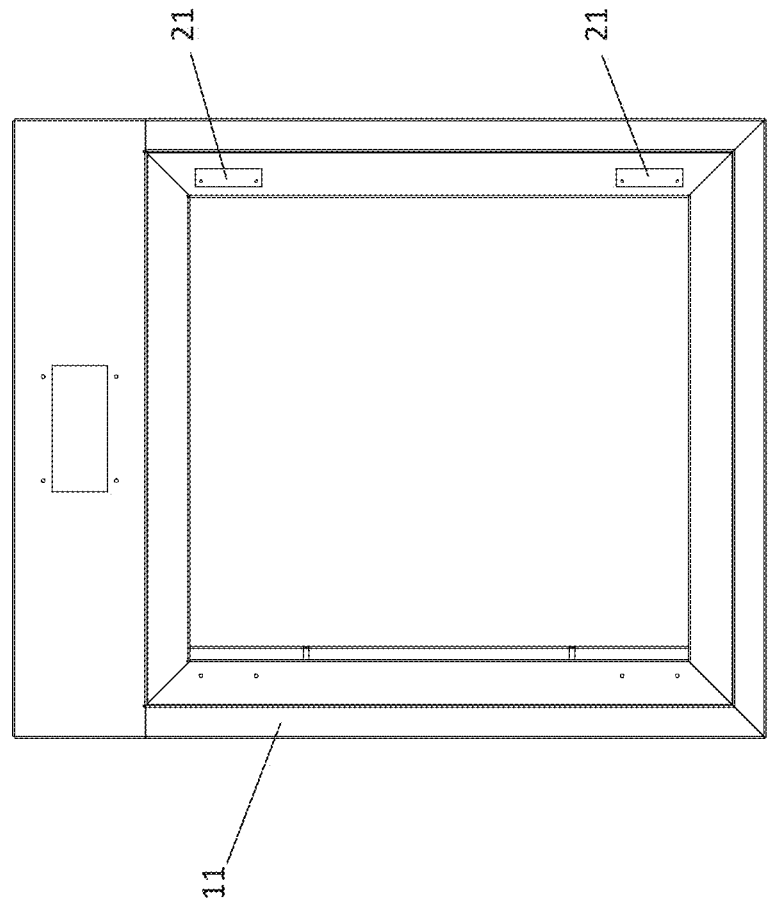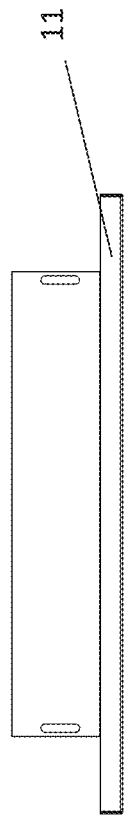
Fig. 22
Fig. 23
Fig. 24

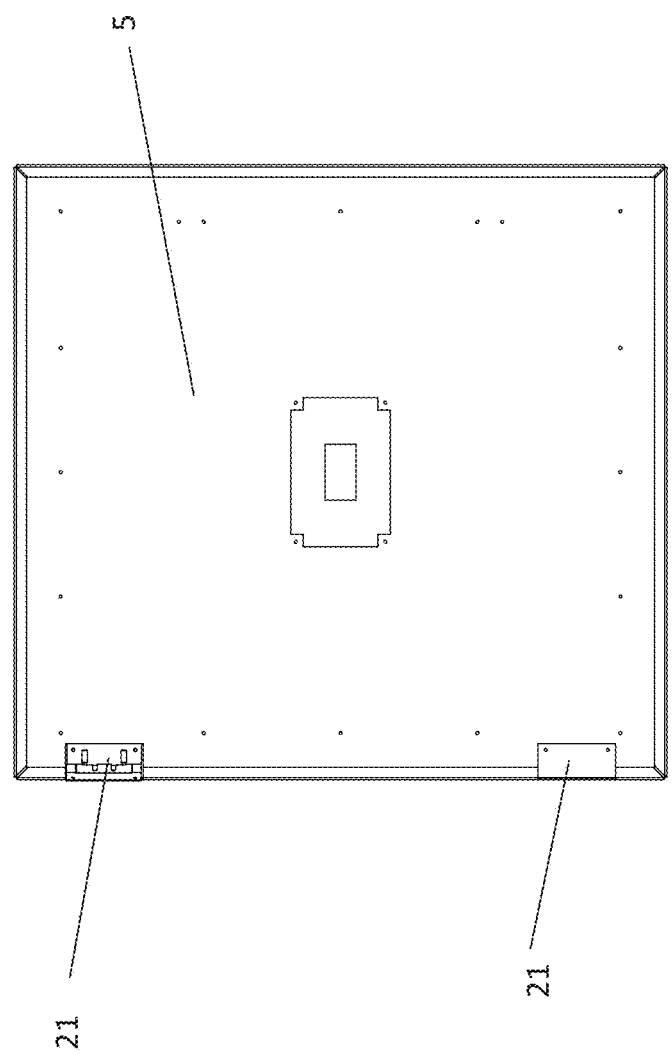

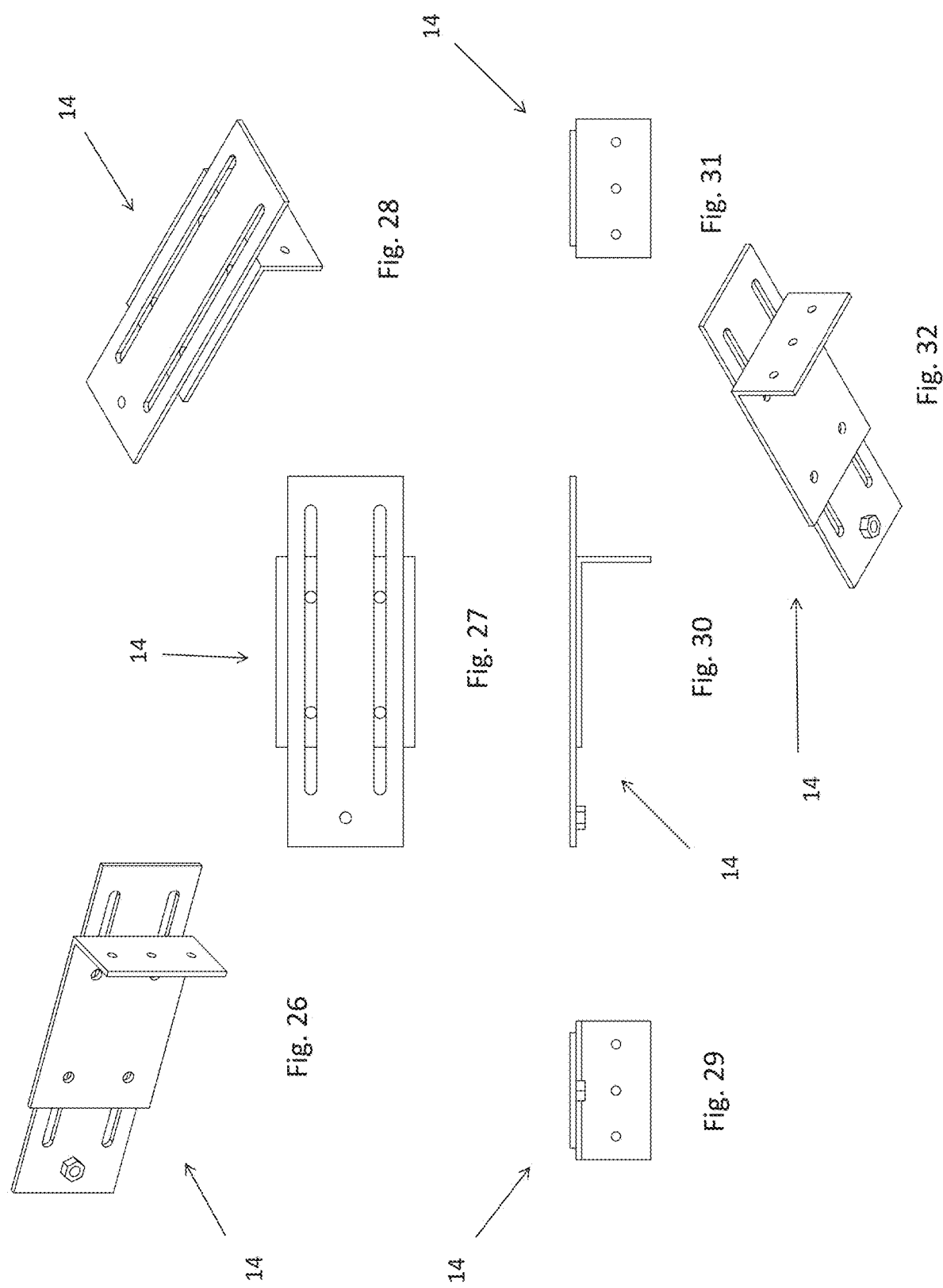

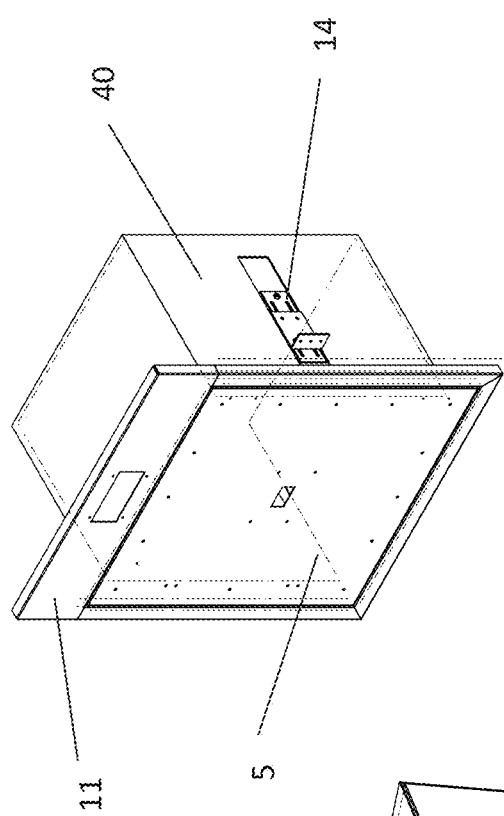
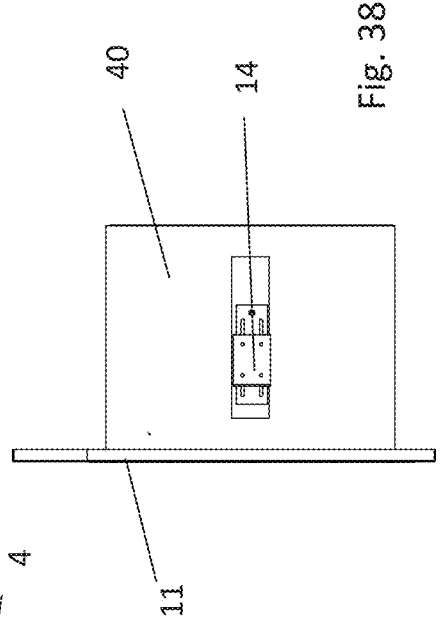
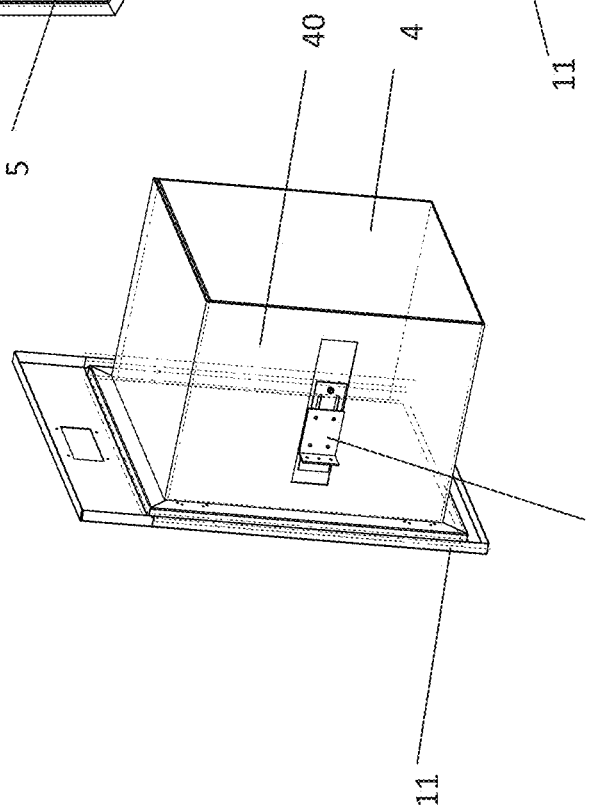

PARCEL SAFE SYSTEM

CROSS REFERENCE

This application is a continuation-in-part of and claims priority to U.S. application Ser. No. 17/510,827 filed Oct. 26, 2021, which is based on and claims priority to U.S. Application No. 63/105,569 filed Oct. 26, 2020.

BACKGROUND OF THE INVENTION

Field of the Invention

This invention relates generally to a parcel safe system, and more particularly, but not by way of limitation, to a secure package delivery system/vault with smart home technology and features combined to significantly reduce the risk of package theft for residential, multi-family, and commercial locations.

Description of the Related Art

Over 27 million packages were stolen in 2017, with the yearly total increasing to 210 million stollen in 2021 upon delivery to homes and businesses, including presents, prescriptions, groceries, and other items. Even when packages are not stolen, they are typically left in locations that are not environmentally controlled, which can be problematic for groceries and prescriptions.

Delivery drivers sometimes try to hide packages from view, but this is not always possible or even attempted. Delivery drivers sometimes ring doorbells and some homeowners and business owners use security cameras with motion detectors to notify them when a delivery is made, but the owner may not be in a position to retrieve the package even upon notification. Pre-fabricated boxes for receiving deliveries are sometimes placed near a door, porch, or entry location and equipped with locking technology, but such boxes are typically not temperature controlled and are subject to being stolen or broken into themselves. Many owners must resort to having friends pick up packages, having packages delivered to their place of work, or picking up packages from a delivery site such as Amazon lockers, all of which can be inconvenient.

Based on the foregoing, it is desirable to provide a parcel safe system that can be integrated into the home or building structure itself, significantly reducing the risk of package theft.

It is further desirable for the parcel safe system to use modular construction, allowing for customization and easy replacement of damaged components that are key to the product's aesthetic and functional operation by the homeowner, as well as easy operations and installation for both the installer and homeowner.

It is further desirable for the parcel safe system to incorporate smart home technology or be incorporated into existing smart home technology systems.

It is further desirable for the parcel safe system to provide a controlled environment, suitable for temporary storage of groceries and prescriptions.

It is further desirable for the parcel safe system to incorporate plug and play features and options, allowing for customization by the homeowner tailored to their specific needs and price point.

It is further desirable for the parcel safe system to incorporate adjustable installation brackets to allow easy installation and depth adjustments to accommodate most external home cladding, such as wood or cement siding, brick, back cut stone, stucco, etc.

It is further desirable for the parcel safe system to incorporate a motion detector and camera or scanner for bar code reading, as well as to record movement and activity around the parcel safe unit.

It is further desirable for the parcel safe system to incorporate quick release systems for the door, bezel, box, and pedestal to allow the consumer to repair, change, or adjust major parcel safe components without a third party service person.

SUMMARY OF THE INVENTION

In general, in a first aspect, the invention relates to a system comprising a parcel safe and a server, where the parcel safe is in communication with the server. The parcel safe may comprise a bezel; a door, where the door connects to the bezel via hinges; and a latch. The hinges may be quick release hinges. The parcel safe may further comprise a box, where the bezel is removably attached to the box, such as via a quick release system.

The system may further comprise at least one positioning bracket, where each positioning bracket is capable of being mounted to framing of a structure and the box is capable of adjustably mounting to the positioning brackets such that the box, bezel, and door are capable of being installed at an adjustable depth relative to the framing and exterior cladding of the structure. Each positioning bracket may comprise at least one horizontal channel, and each positioning bracket may attach to one side of the box at the channel via at least one attachment device, such that the box is capable of sliding forward or backward along the channels relative to the positioning bracket when the attachment devices are not secured and being secured in place in the desired position by the attachment devices.

The parcel safe may further comprise a computer in communication with the server and with the latch and one or more cameras in communication with the computer, where the computer is capable of receiving visual input from the camera and matching the visual input with data from the server indicating an expected delivery and unlocking the latch to allow receipt of the expected delivery within the parcel safe. The system may further comprise one or more of: a door closed sensor; audible output; a motion detector; one or more lights; a battery; an AC power connection; a Bluetooth antenna; a Wi-Fi antenna; and/or a Zigbee or similar IoT communication system.

The parcel safe may further comprise a computer in communication with the server and with the latch and one or more RFID receivers in communication with the computer, where the computer is capable of receiving input from the RFID receiver and matching the input with data from the server indicating an expected delivery and unlocking the latch to allow receipt of the expected delivery within the parcel safe.

The system may further comprise a mobile application in communication with the parcel safe via the server and/or a shipping company interface in communication with the server.

The parcel safe may be insulated and/or temperature controlled, allowing short-term storage of groceries or prescriptions.

In a second aspect, the system may comprise a parcel safe and a server, where the parcel safe comprises: a computer in communication with the server; a bezel; a door, where the door connects to the bezel via hinges; and a latch. The hinges may be quick release hinges.

The system may further comprise at least one positioning bracket, where the positioning bracket is capable of being mounted to framing of a structure and the bezel is capable of adjustably mounting to the positioning bracket such that the bezel is capable of being installed at an adjustable depth relative to the framing and exterior cladding. Each positioning bracket may comprise at least one horizontal channel and each positioning bracket may attach to one side of the bezel at the channel via at least one attachment device, such that the bezel is capable of sliding forward or backward along the channels relative to the positioning bracket when the attachment devices are not secured and being secured in place in the desired position by the attachment devices.

The computer may be equipped with speech recognition software such that the system is capable of accepting verbal commands. The computer may be capable of providing diagnostic information to the server such that the server is capable of providing remote diagnostics and troubleshooting. The parcel safe may further comprise one or more features and the computer may be capable of toggling each of the features on and off at the direction of commands communicated remotely via the server.

The bezel may have a right side and a left side and the parcel safe may further comprise a universal door jamb such that the bezel is capable of accepting the hinges on either the right side or the left side to assist the homeowner in dealing with different access issues. The system may further comprise an emergency door release, an electronic keypad, key fob, and/or a manual keylock. The manual keylock may provide access redundancy for homeowner convenience in case of prolonged power outage or a more convenient access in certain circumstances, while the key fob may provide access redundancy and homeowner convenience. The electronic keypad may provide access redundancy for the delivery company in case the barcode information is not accessible or operable.

BRIEF DESCRIPTION OF THE DRAWINGS

FIG. 17 is front view of the door and bezel embodiment of the parcel safe;
FIG. 18 is a top view of the door and bezel embodiment of the parcel safe;
FIG. 19 is a perspective view of the door and bezel embodiment of the parcel safe;
FIG. 20 is a side view of the door and bezel embodiment of the parcel safe;
FIG. 22 is a front view of the door and bezel embodiment of the parcel safe;
FIG. 23 is a back view of the door and bezel embodiment of the parcel safe;
FIG. 24 is a top view of the door and bezel embodiment of the parcel safe;
FIG. 25 is a back view of the door of the parcel safe;
FIGS. 26 through 32 are various views of the positioning bracket of the parcel safe;
FIG. 36 is a side perspective view of the parcel safe in place within the positioning sleeve;
FIG. 37 is a front perspective view of the parcel safe in place within the positioning sleeve;
FIG. 38 is a side view of the parcel safe in place within the positioning sleeve.

Figure 1:
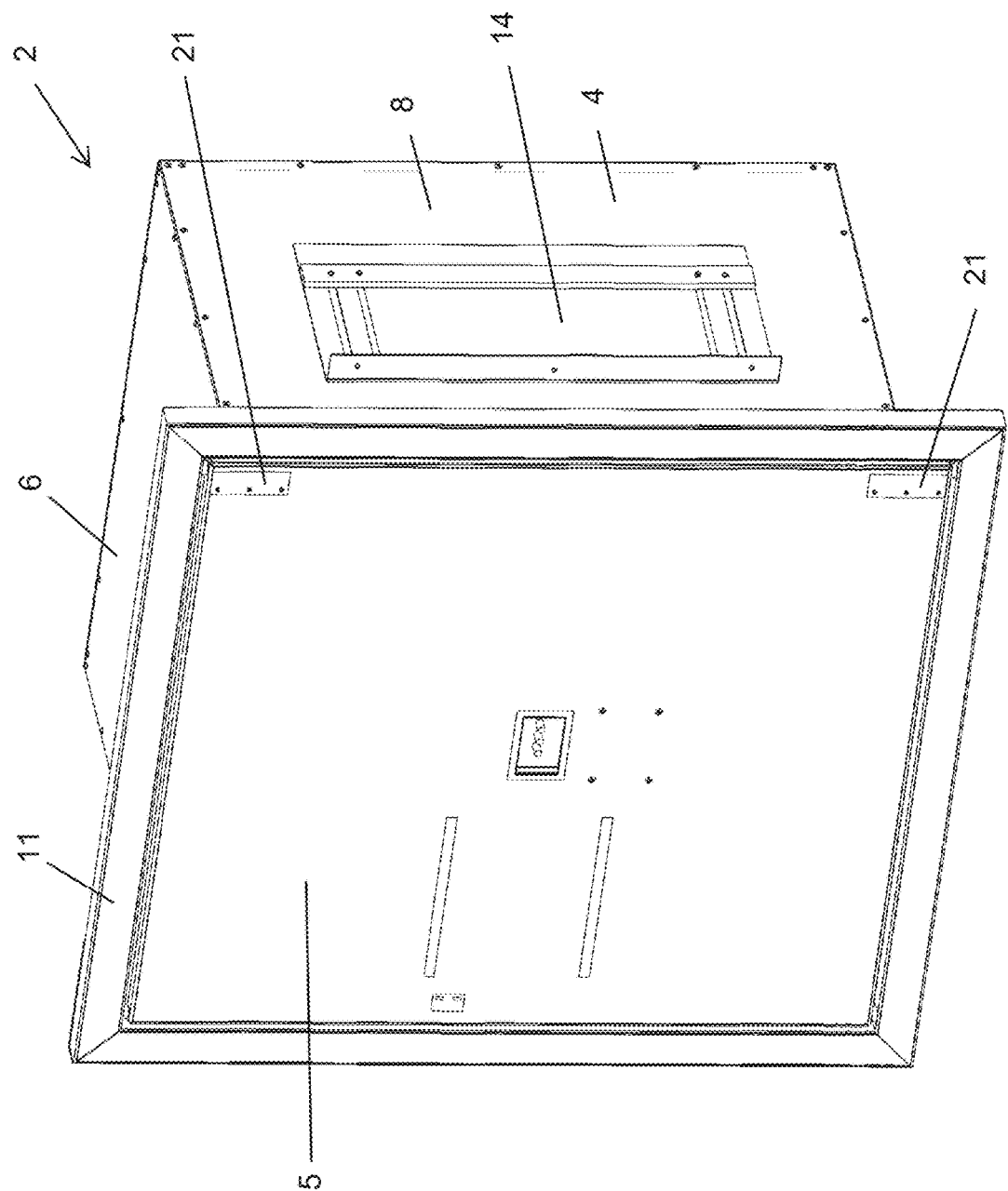
FIG. 1 is a front perspective view of one embodiment of the parcel safe.
Figure 2:
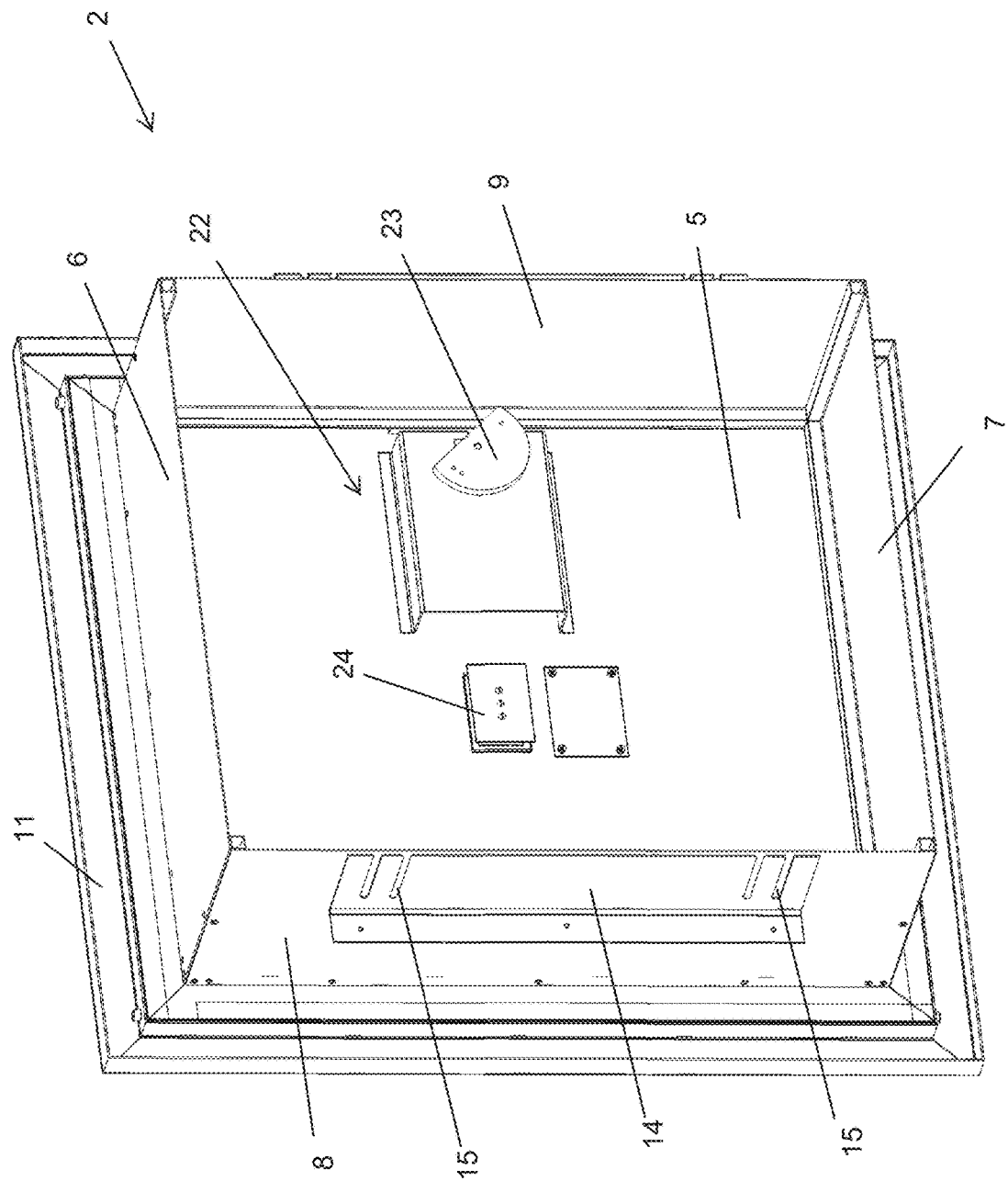
FIG. 2 is a back perspective section view of the parcel safe.
Figure 3:
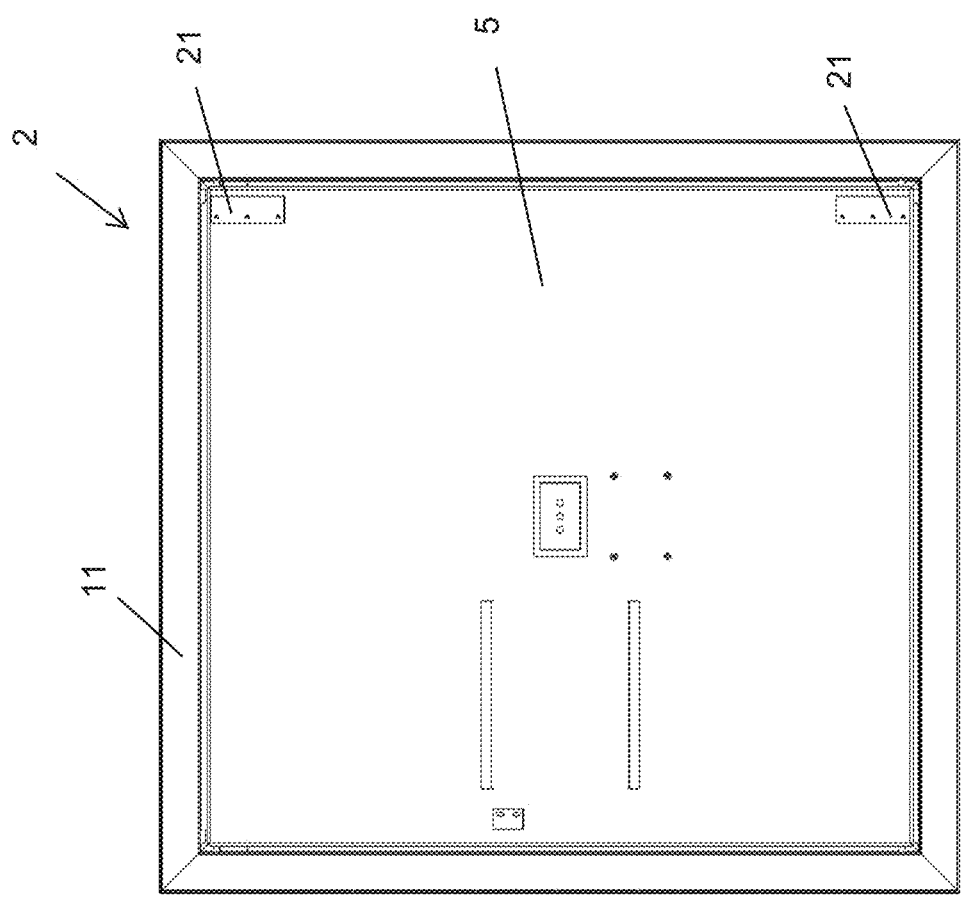
FIG. 3 is a front view of the parcel safe.
Figure 4:
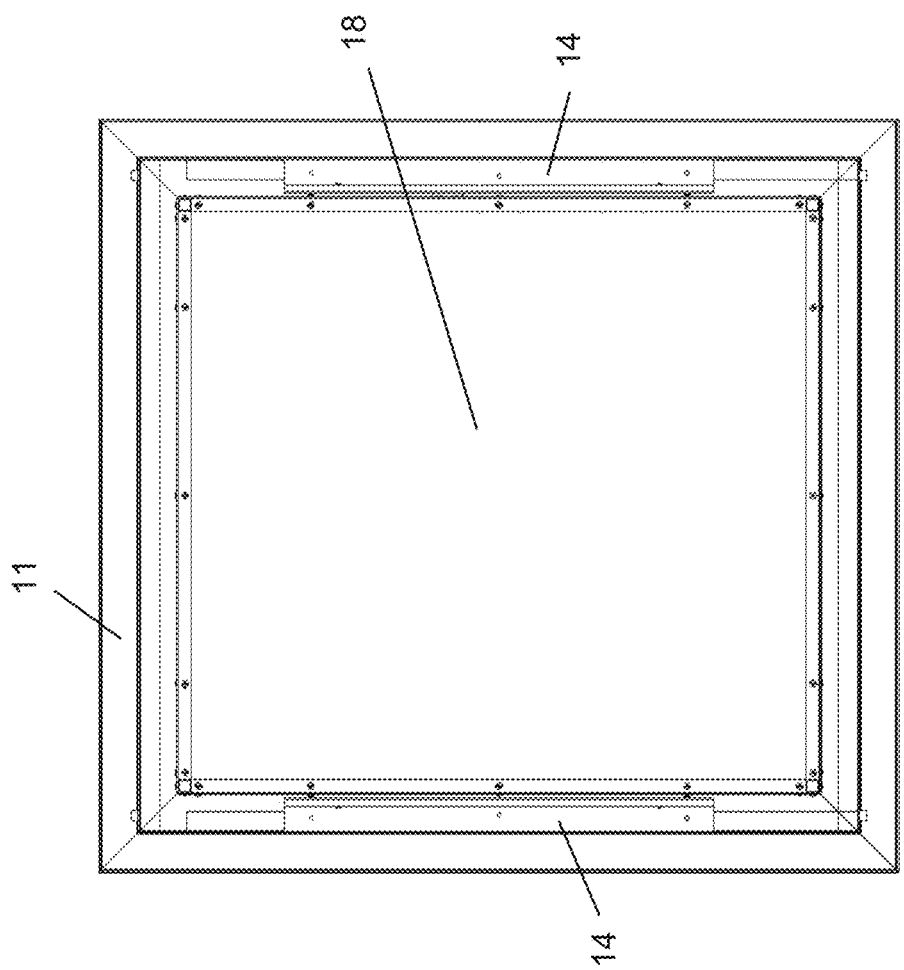
FIG. 4 is a back view of the parcel safe.
Figure 5:
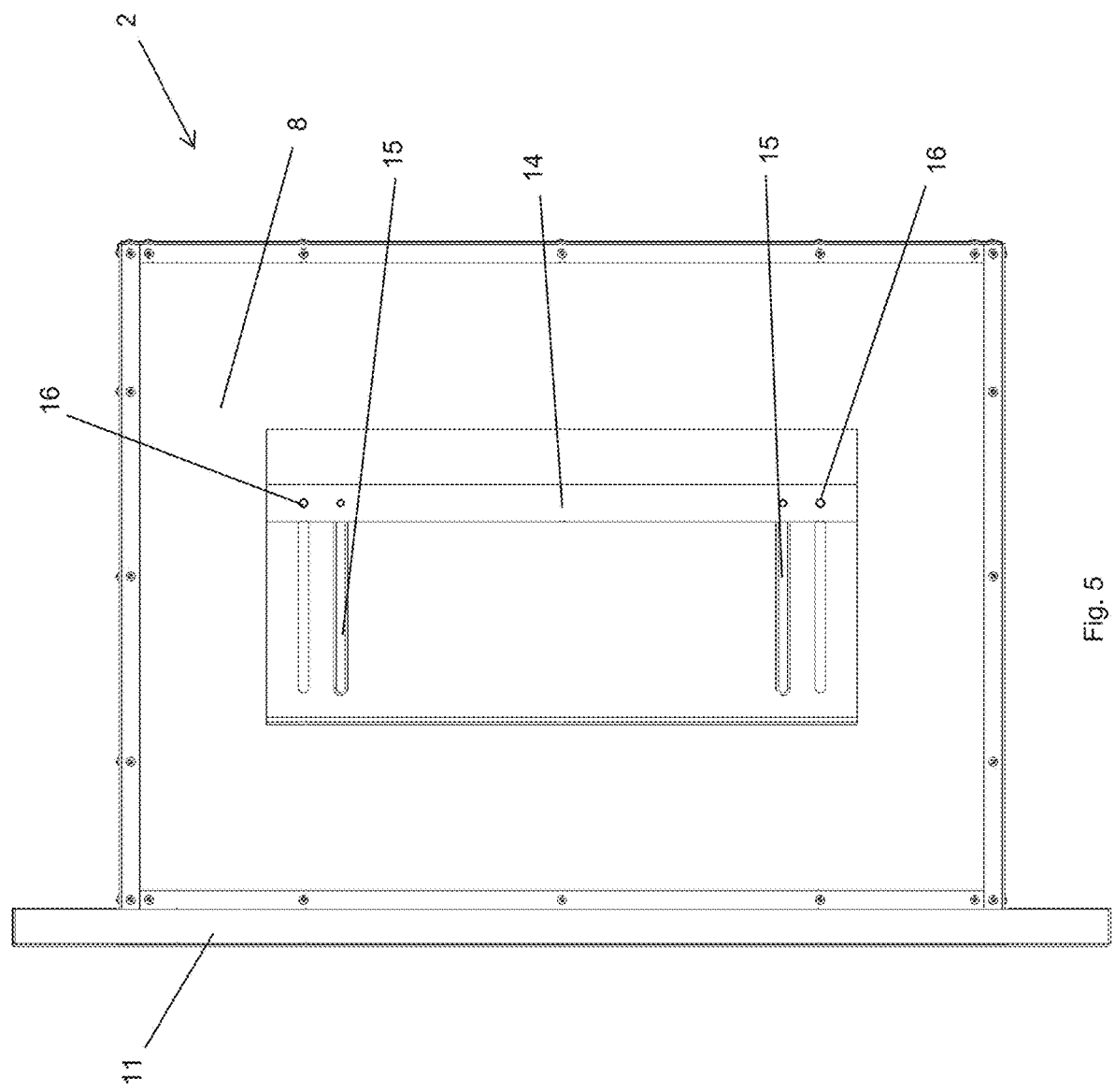
FIG. 5 is a side view of the parcel safe.
Figure 6:
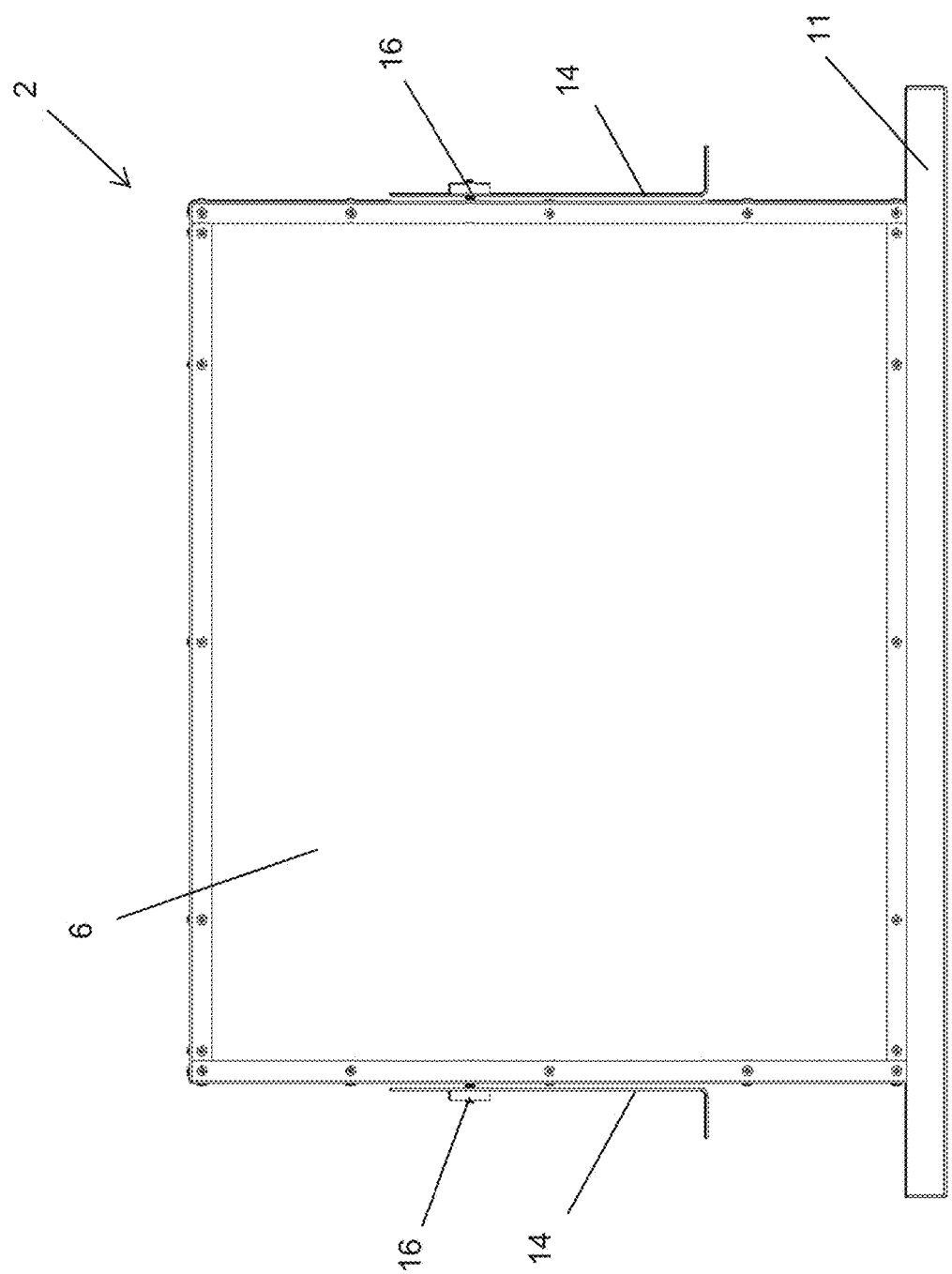
FIG. 6 is a top/bottom view of the parcel safe.
Figure 7:
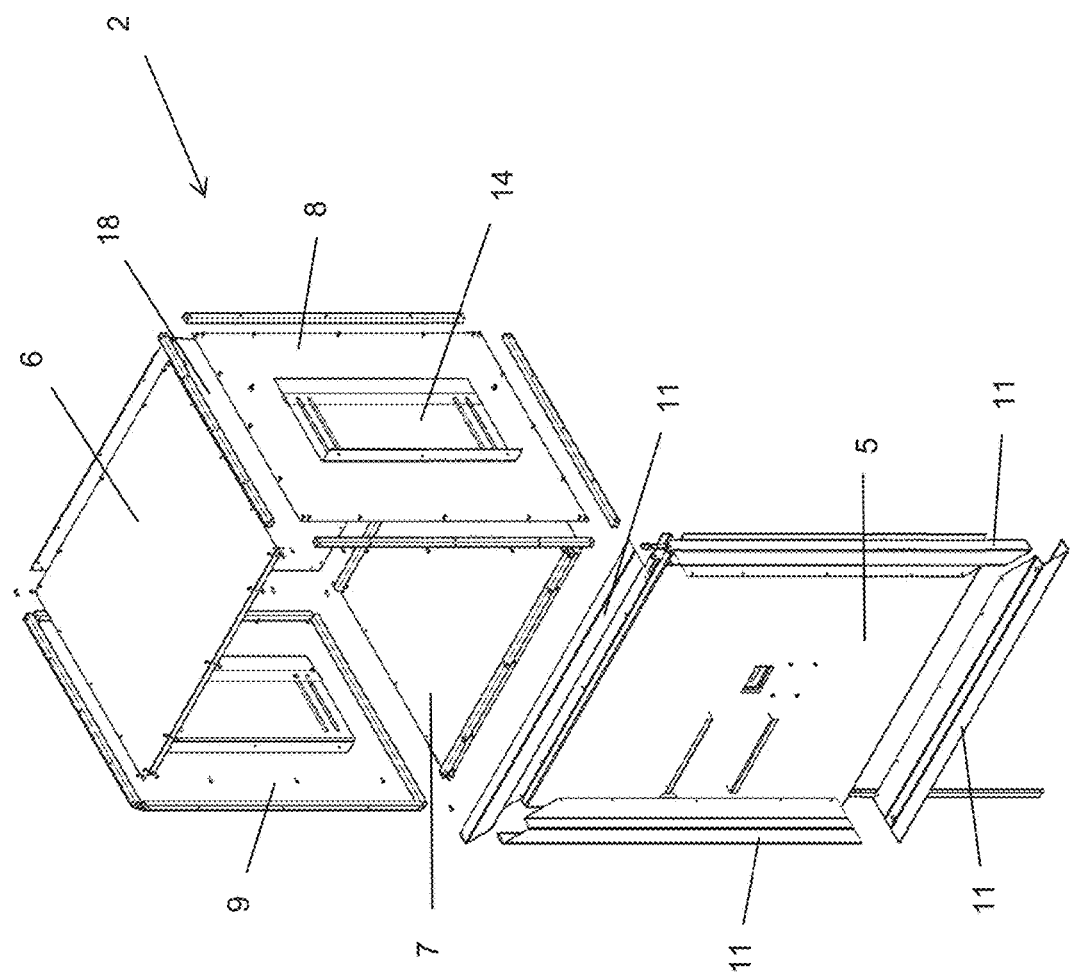
FIG. 7 is a front perspective exploded view of the parcel safe.
Figure 8:
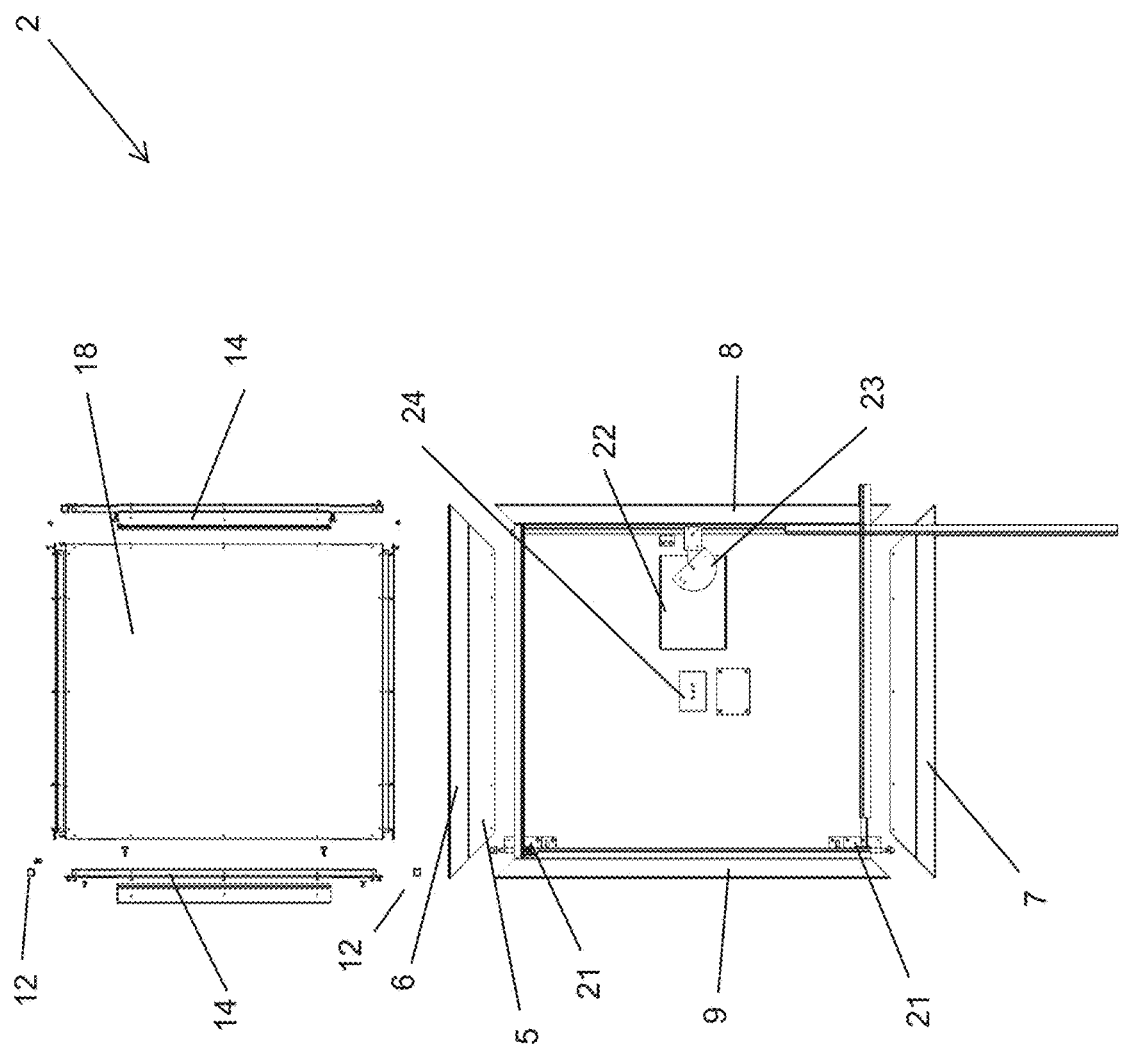
FIG. 8 is a back exploded view of the parcel safe.
Figure 9:
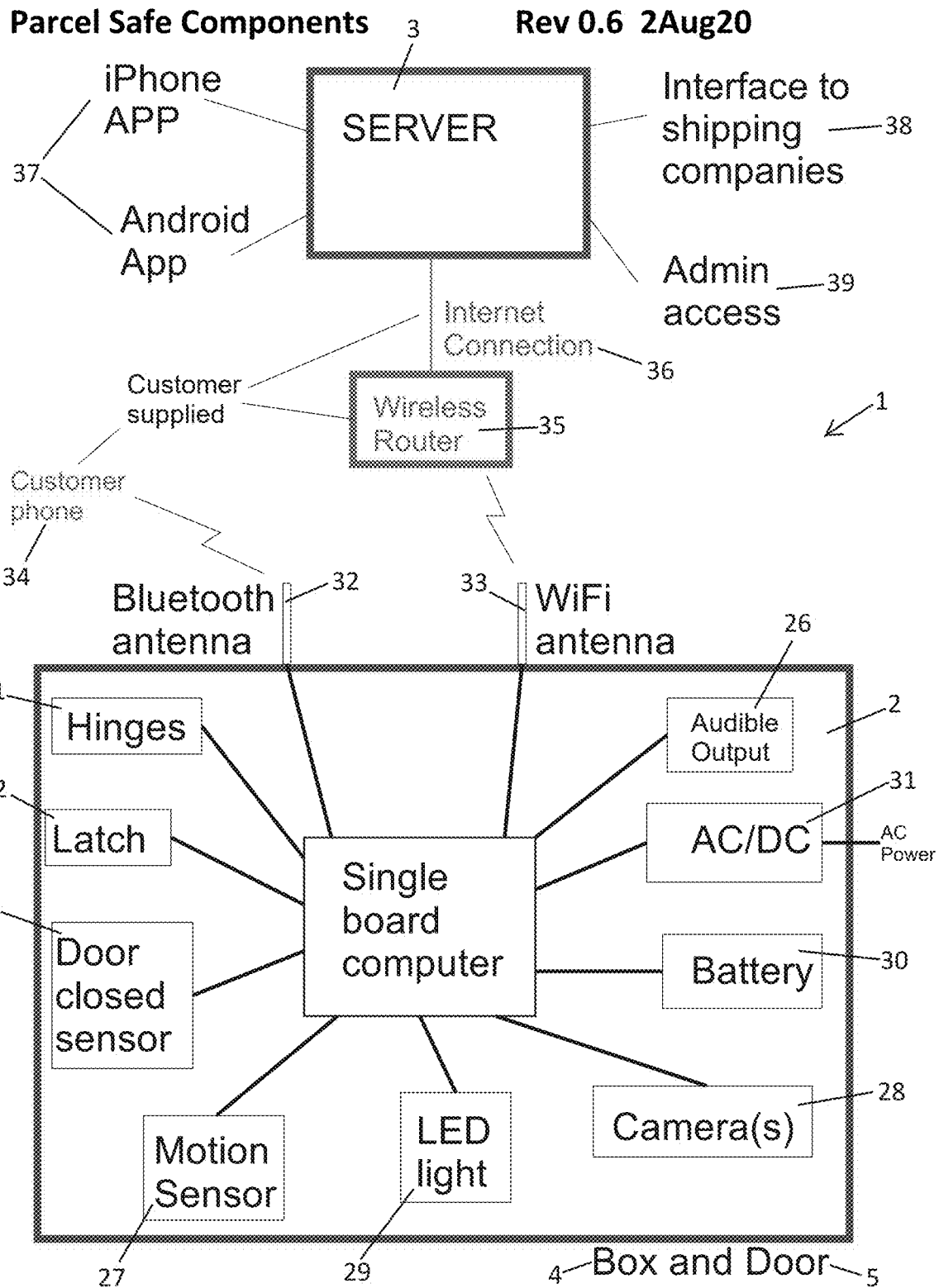
FIG. 9 is a diagrammatic view of the parcel safe system.
Figure 10:
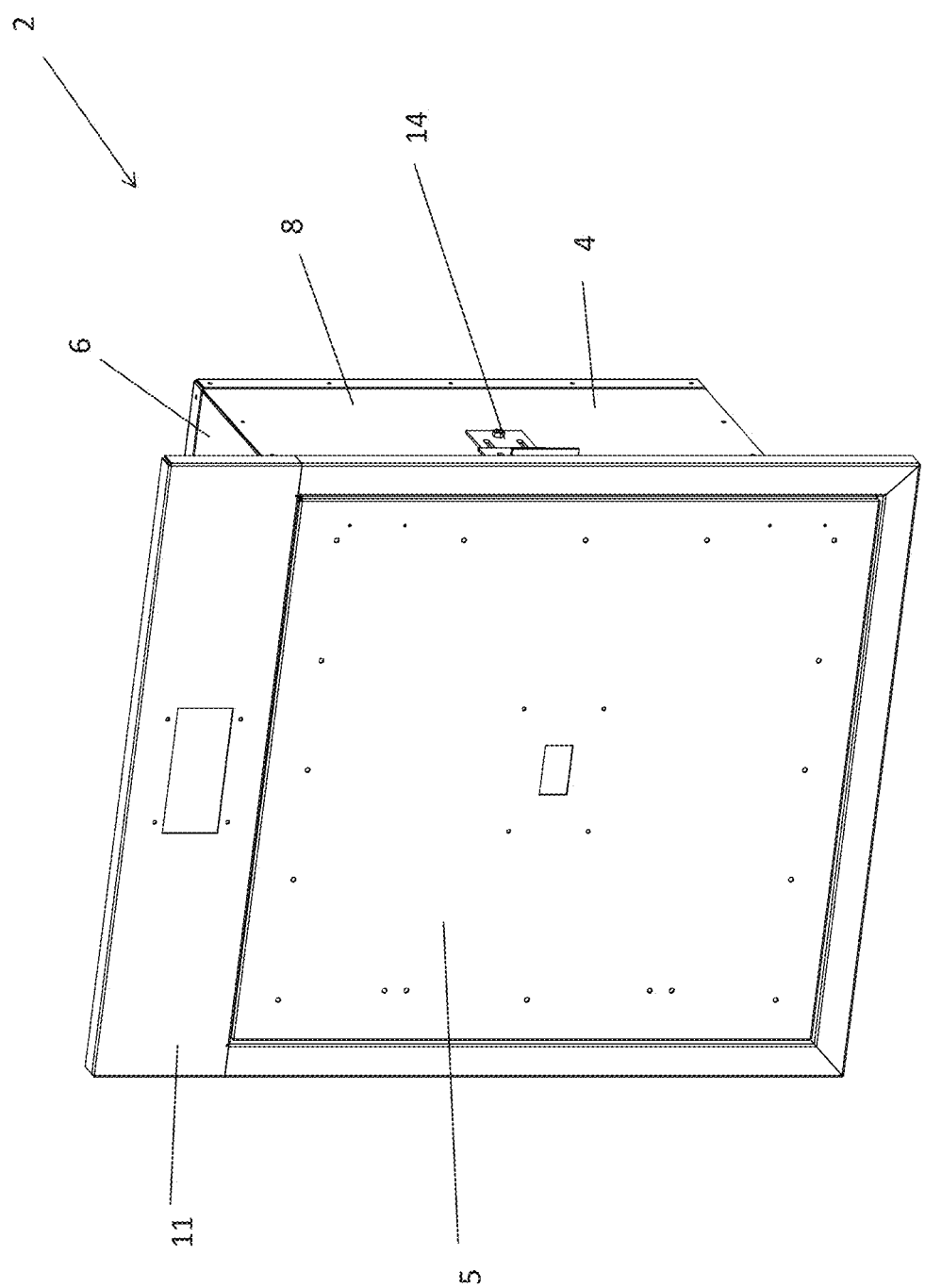
FIG. 10 is a front perspective view of an alternate embodiment of the parcel safe.
Figure 12:
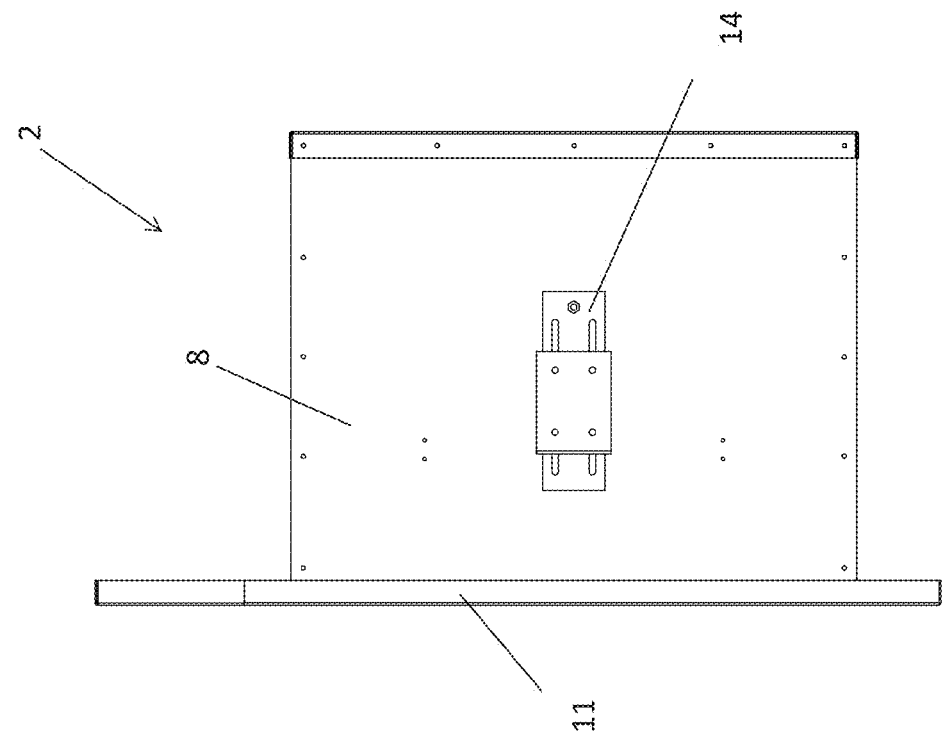
FIG. 12 is a side view of the parcel safe.
Figure 11:
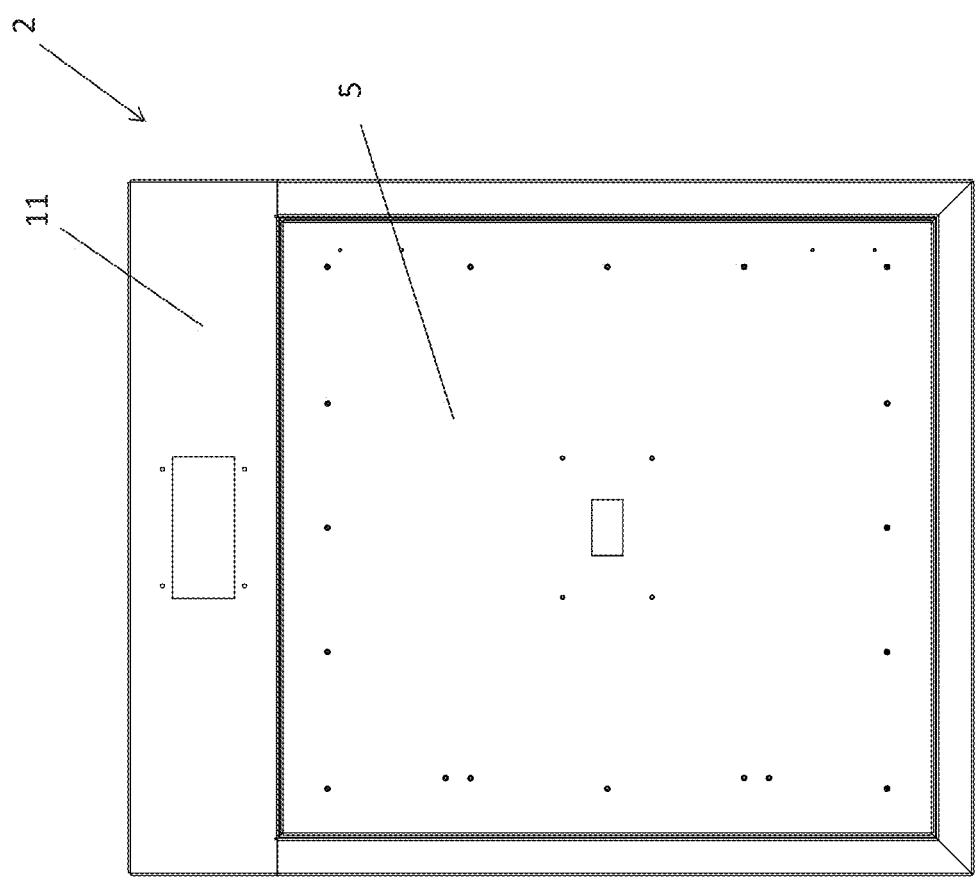
FIG. 11 is a front view of the parcel safe.
Figure 13:
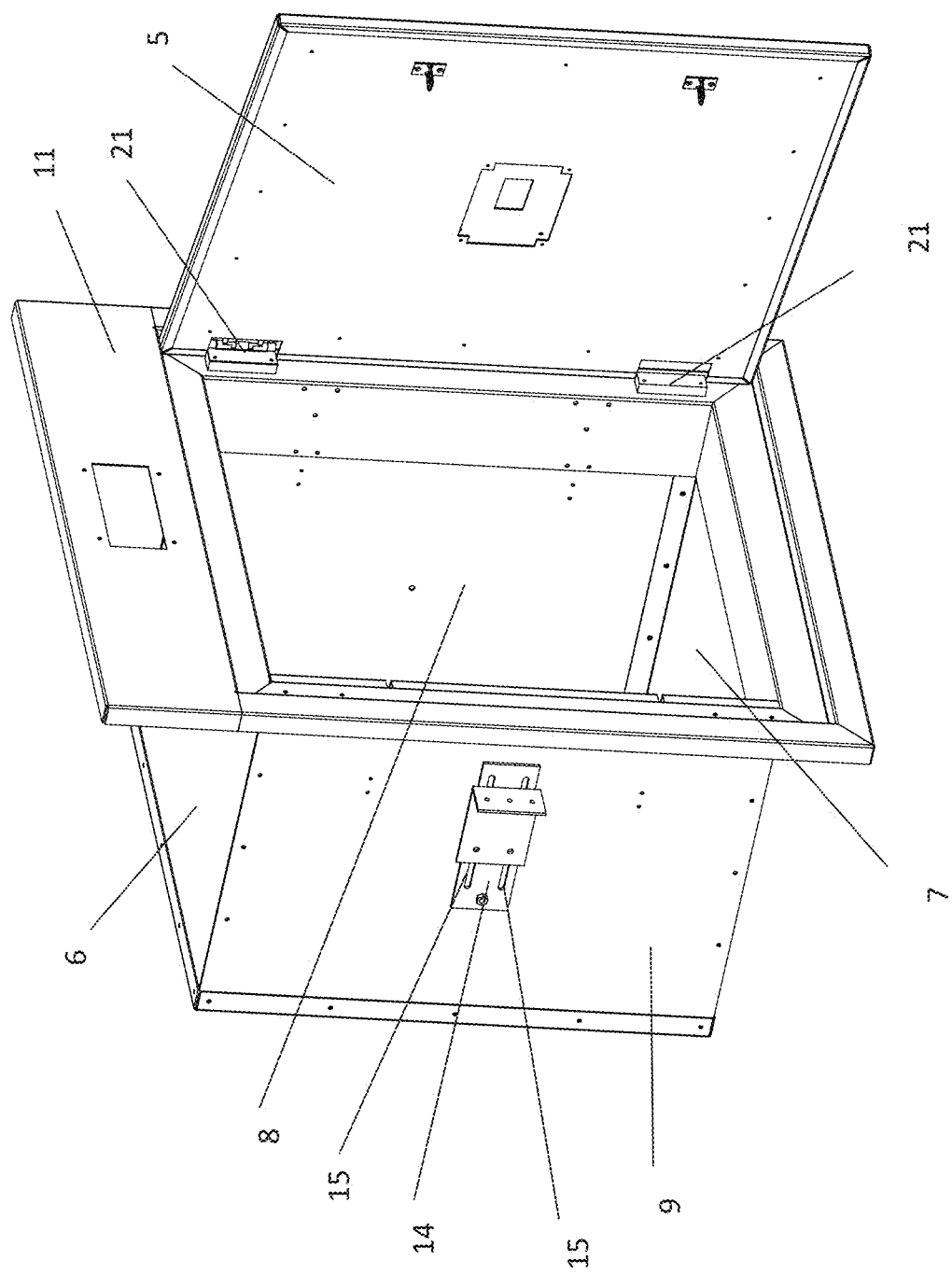
FIG. 13 is a perspective view of the parcel safe with the door open.
Figure 15:
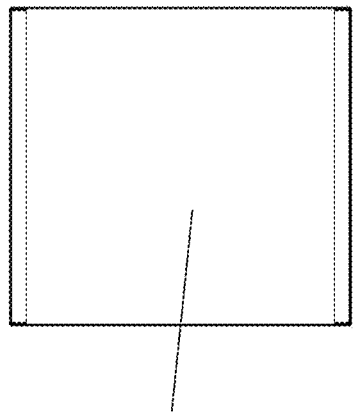
FIG. 15 is a bottom view of the box of the parcel safe.
Figure 16:
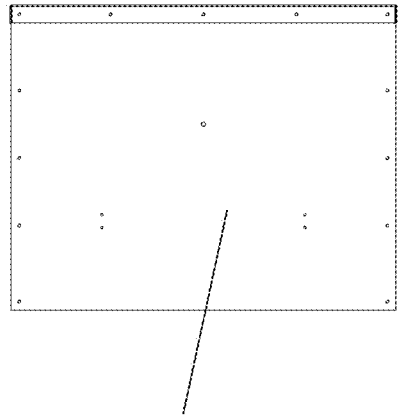
FIG. 16 is a side view of the box of the parcel safe.
Figure 14:
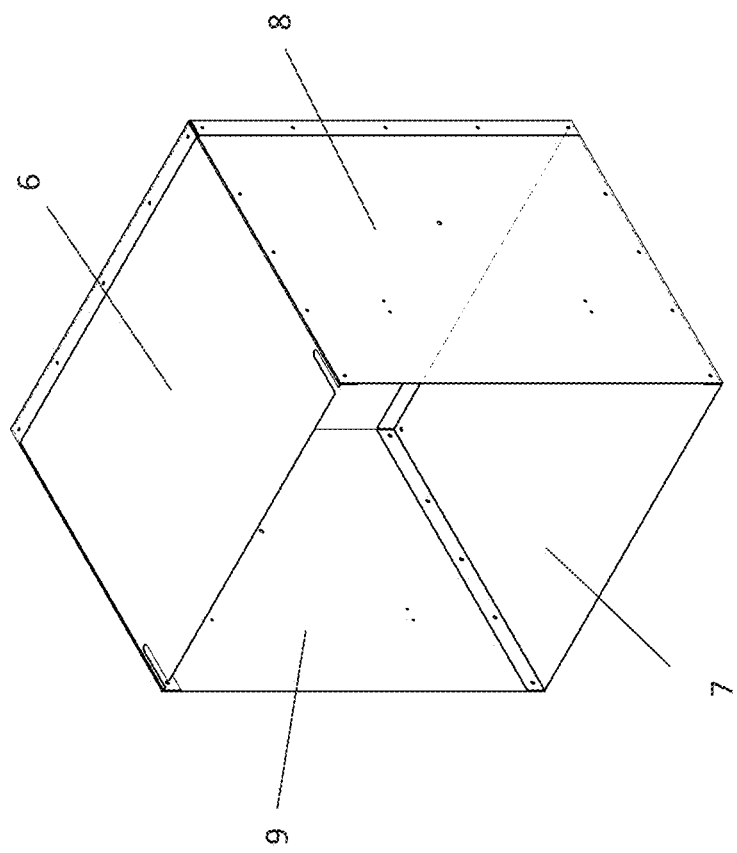
FIG. 14 is a perspective view of the box of the parcel safe.
Figure 21:
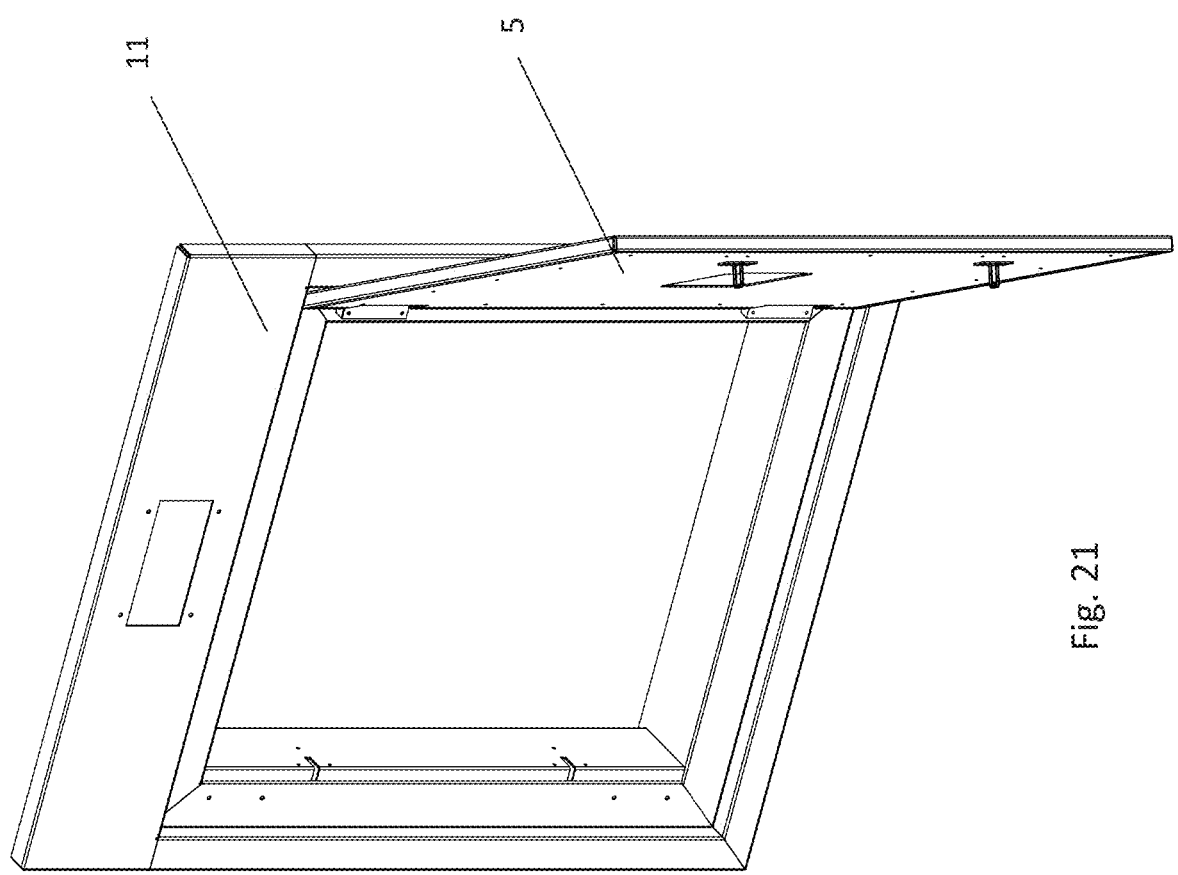
FIG. 21 is a front perspective view of the door and bezel embodiment of the parcel safe with the door open.
Figure 34:
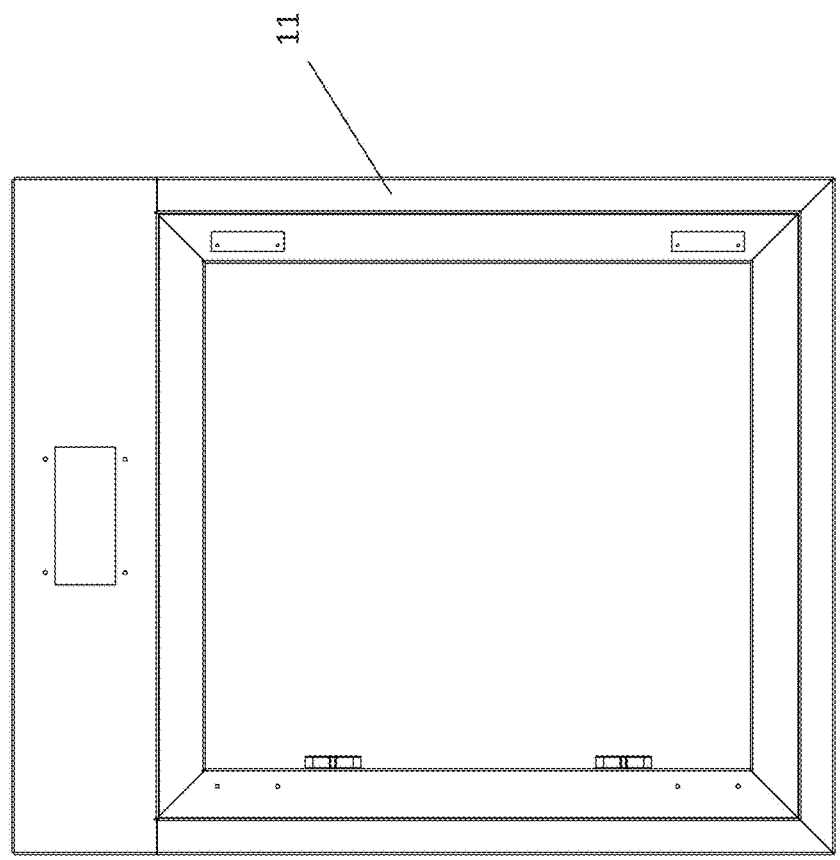
FIG. 34 is a front view of the bezel of the parcel safe.
Figure 33:
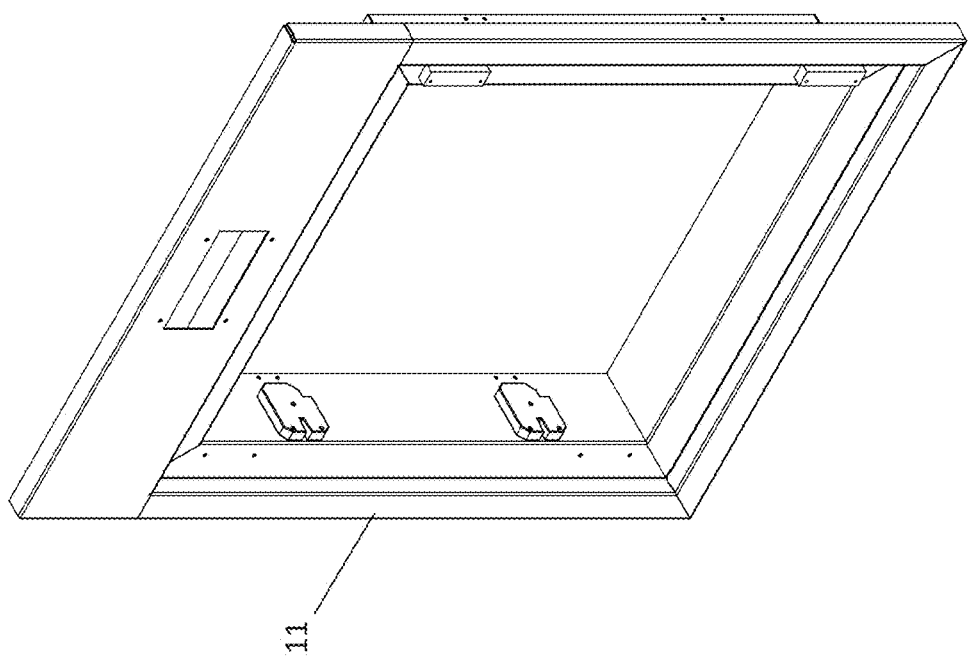
FIG. 33 is a perspective view of the bezel of the parcel safe.
Figure 35:
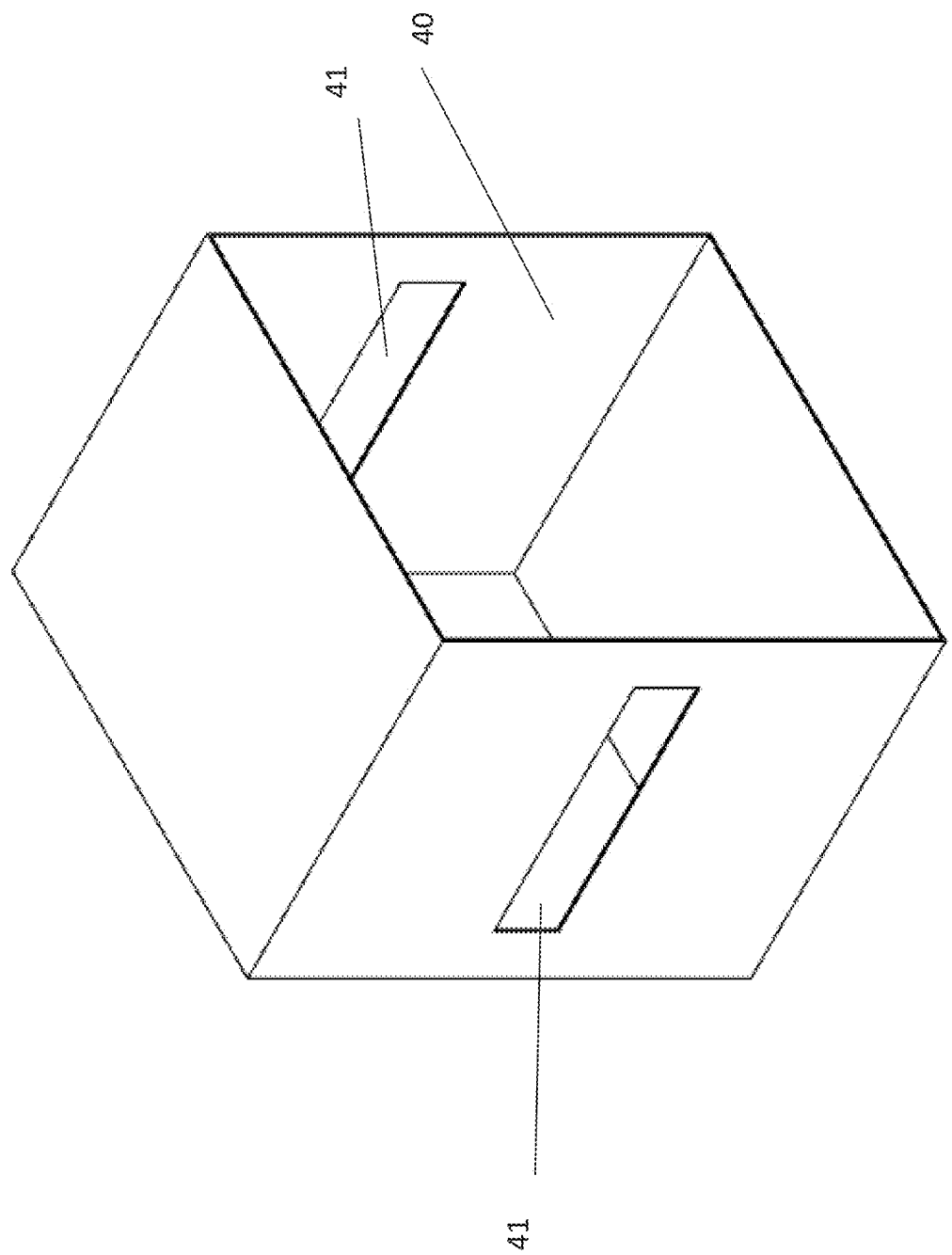
FIG. 35 is a perspective view of the positioning sleeve.
Figure 40:
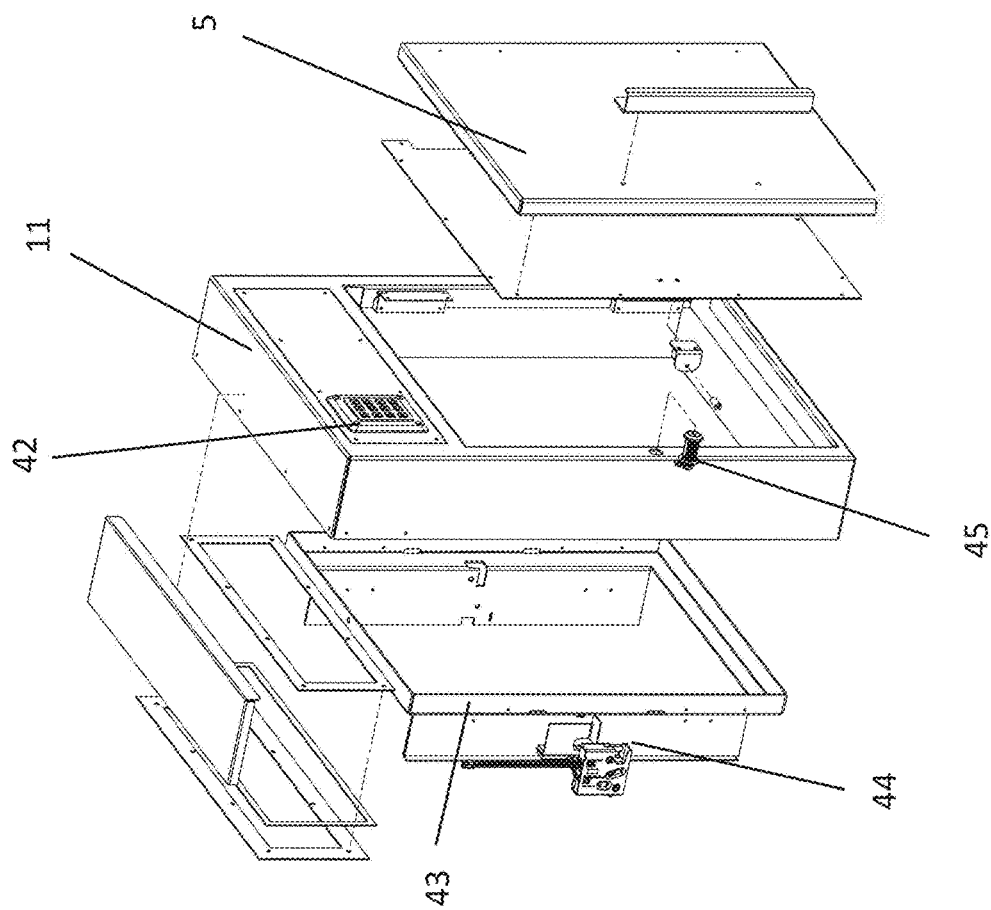
FIG. 40 is an exploded back perspective view thereof.
Figure 39:
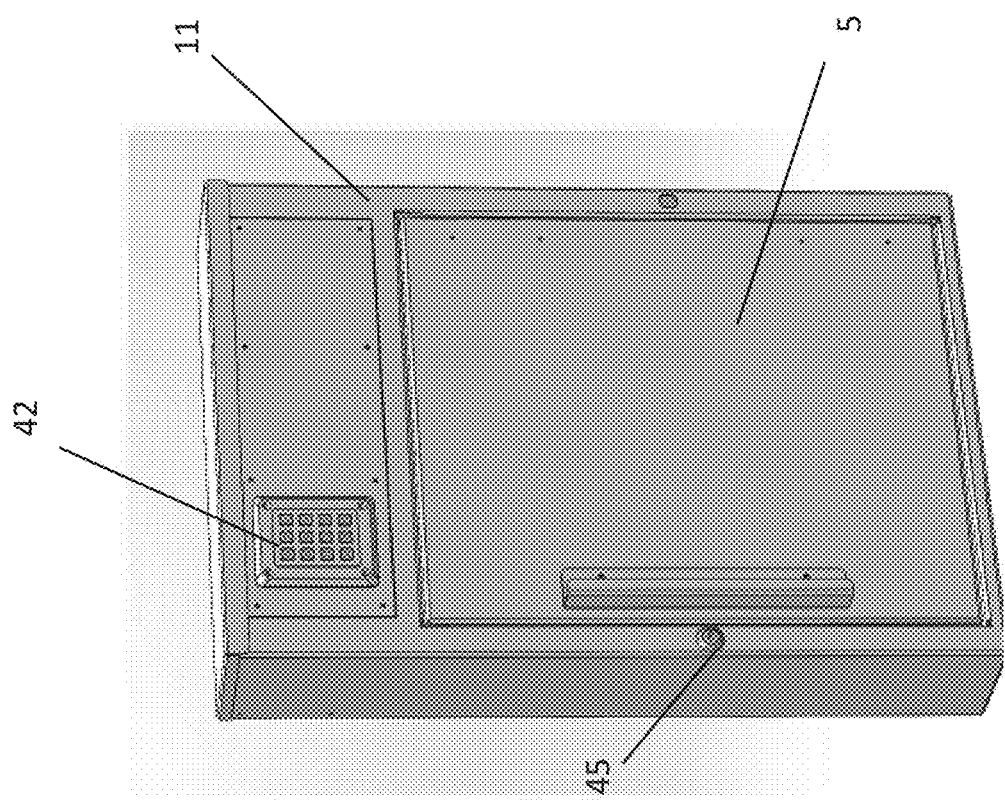
FIG. 39 is a front perspective view of one embodiment of the parcel safe.
Figure 42:
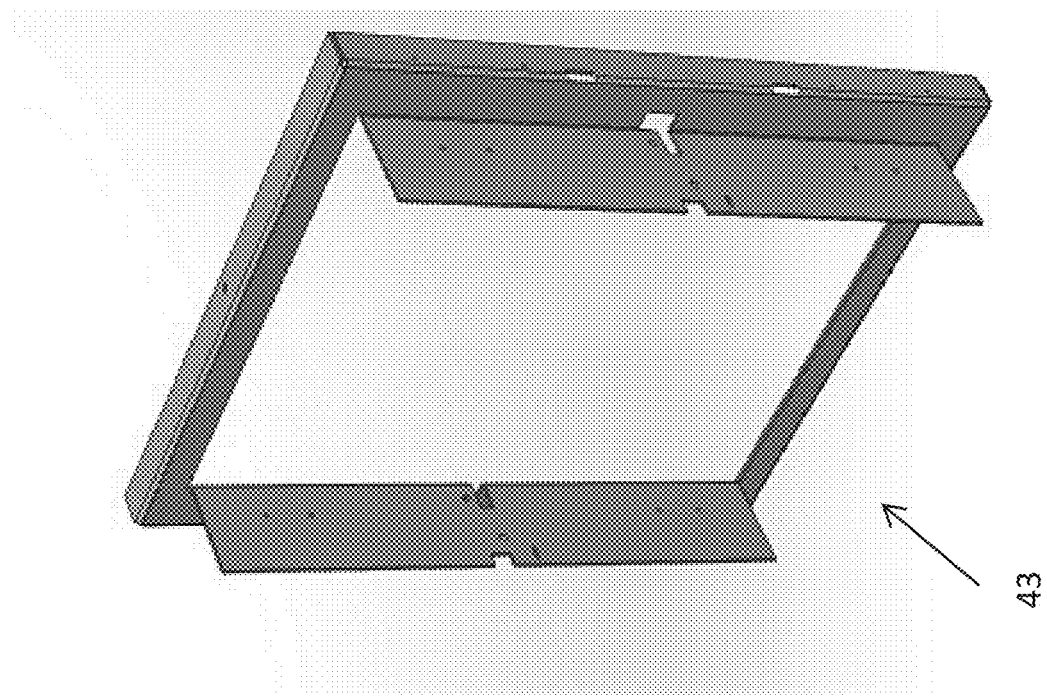
FIG. 42 is a back perspective view of the universal door jamb.
Figure 41:
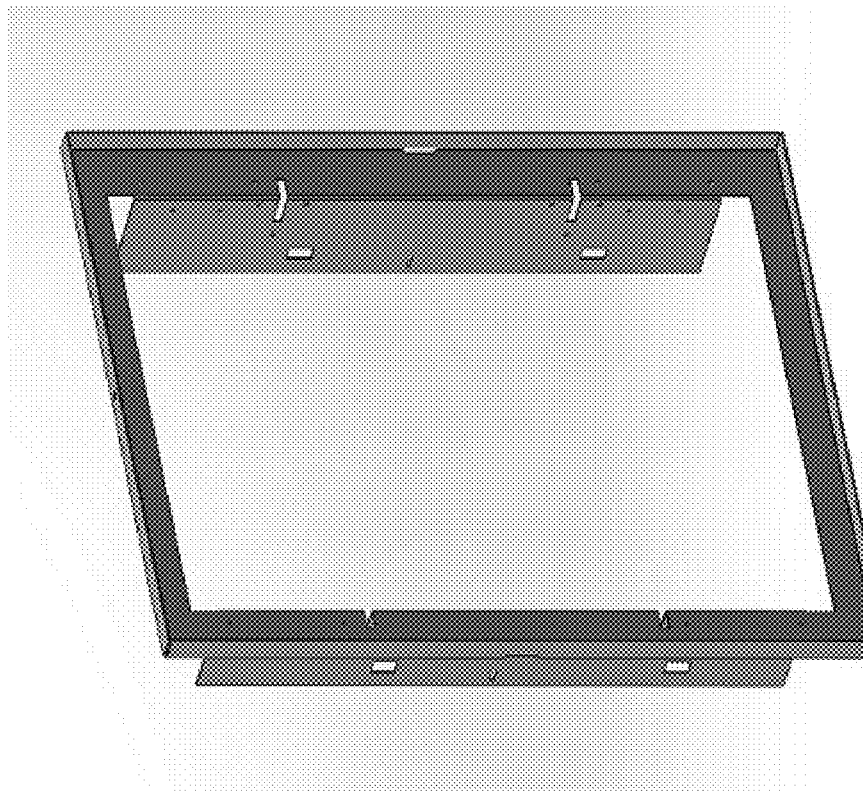
FIG. 41 is a front perspective view of the universal door jamb.
Figure 44:
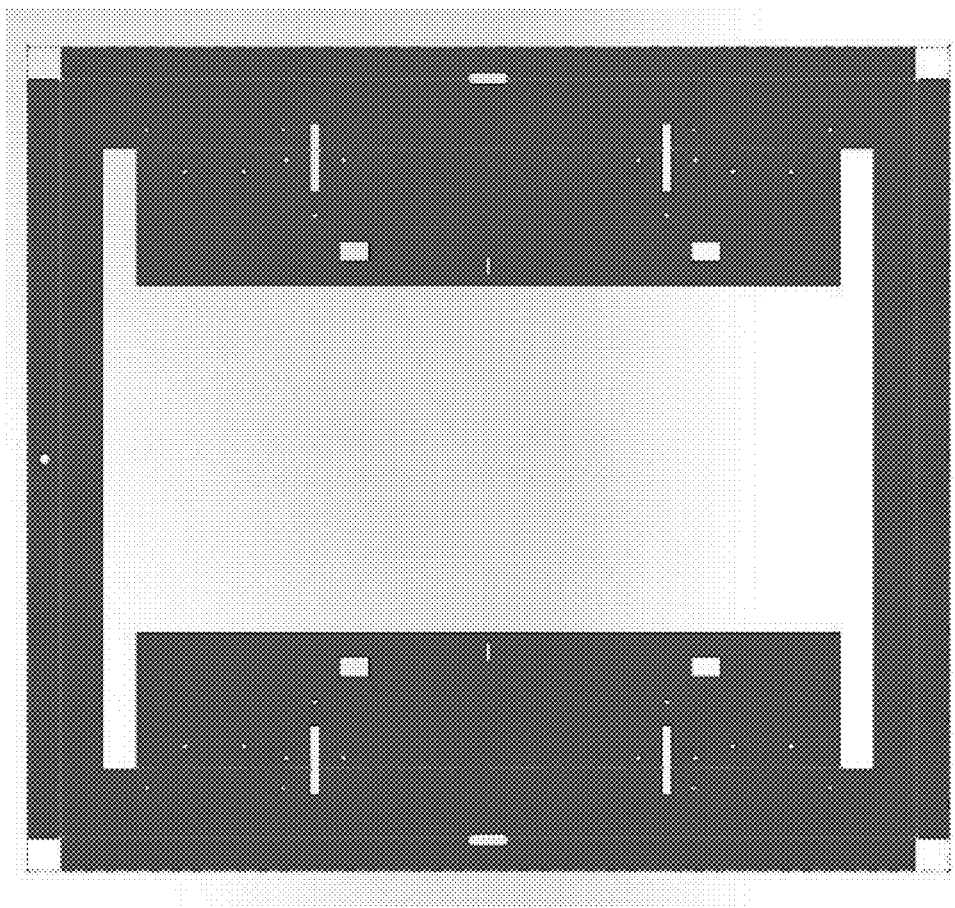
FIG. 44 is a front view thereof.
Figure 43:
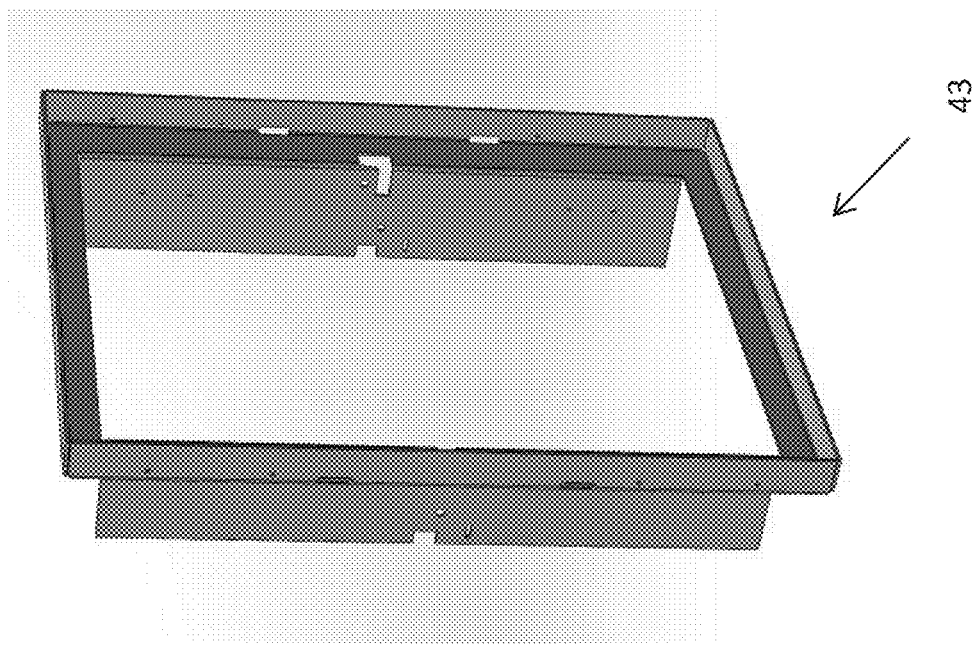
FIG. 43 is a front perspective view of an alternate version of the universal door jamb.
Figure 46:
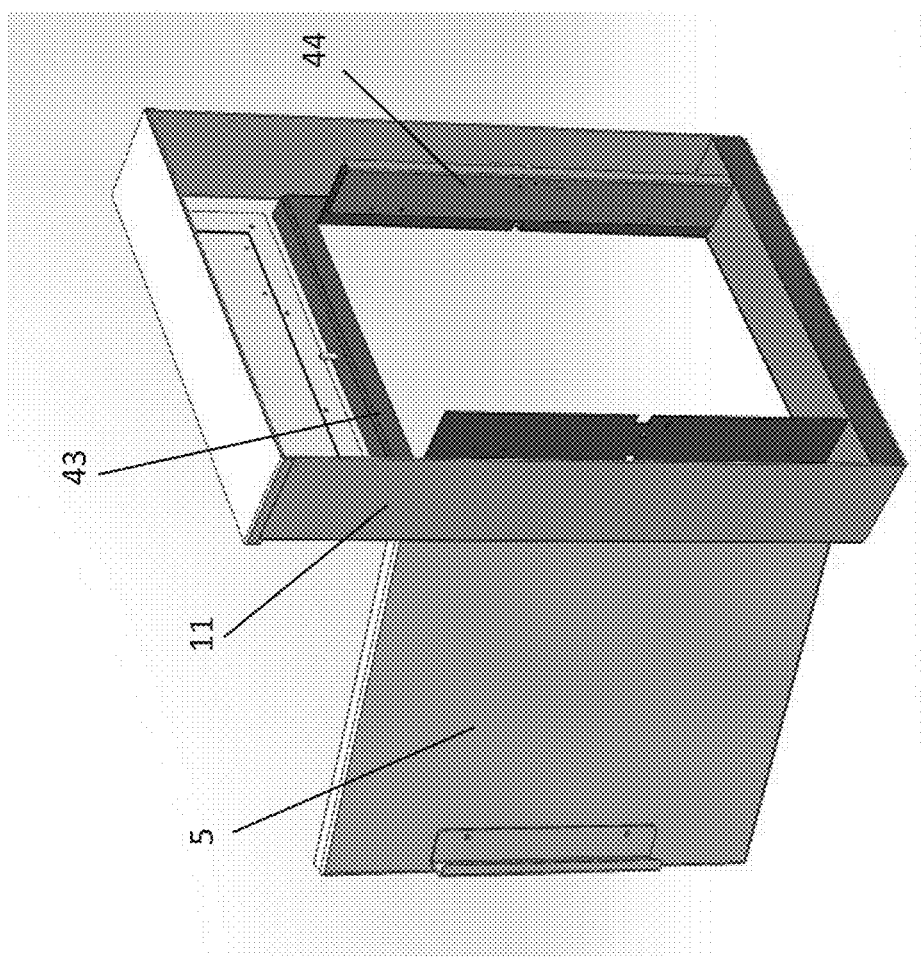
FIG. 46 is a back perspective view thereof.
Figure 45:
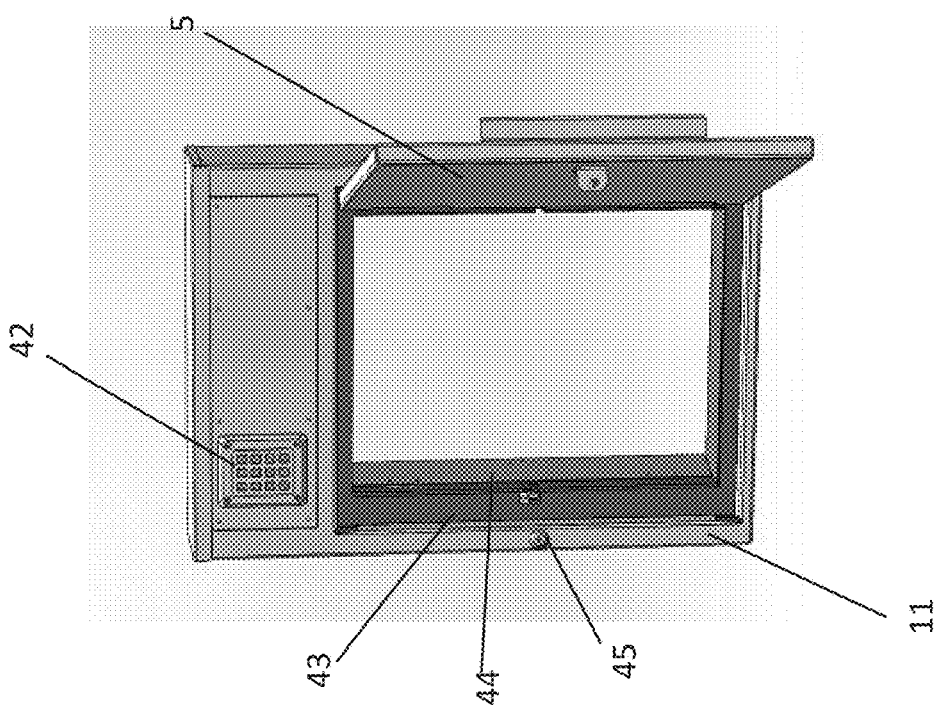
FIG. 45 is a front view of the embodiment of the parcel safe from FIG. 39 with the door open.

Other advantages and features will be apparent from the following description and from the claims.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a parcel safe system 1. The parcel safe system 1 may comprise a parcel safe 2 in communication with a server 3, providing remote access and control of the system 1, such as by the owner.

The parcel safe 2 may have a modular construction, allowing easy customization and repair. The parcel safe 2 may comprise a box 4 with a door 5 on the front of the box 4 for convenient delivery access, and optionally a second door 5 on another face of the box 4 for access from inside the home, for owner-only access, or from behind a gate or walled yard, so the delivery person does not need access to the property. The box 4 may comprise any desired number of panels. For example, the box 4 may comprise a top panel 6, a bottom panel 7, a right side panel 8, and a left side panel 9, with each panel secured to the next at right angles, forming a square or rectangular cross-section, as shown in the drawings. Alternately, the box 4 may comprise any number of panels in any desired configuration. The panels may be of unitary construction or may be separate elements secured to each other via a plurality of attachment devices 10, such as screws, as shown; bolts; rivets; adhesive; welding; or other desired attachment devices. The box 4 may further comprise a bezel 11 on the front of the box 4. The bezel 11 may be of unitary construction with the panels or may attach to the front edge of the panels via a plurality of attachment devices 12, as shown, which may or may not be the same type of attachment devices as attachment devices 10. The bezel 11 may be of unitary construction or may be comprised of multiple parts, as shown.

The box 4 may be capable of being built into a house or other structure during construction. When used with new construction, the box 4 may be installed in the framing of the structure, such that only the door 5 and the bezel 11 are visible when construction is complete, for essential functionality, service/maintenance, and aesthetic reasons. The box 4 may be installed via a pair of positioning brackets 14, which may be adjustable, allowing the installer to adjust the location of the box 4 and bezel 11 within seconds to accommodate a flush or small reveal installation relative to almost any exterior cladding, such as Hardyboard, wood, stone, brick, etc. The adjustable positioning brackets 14 may also allow for the box 4 to be removed if necessary, minimizing any demolition of the surrounding framing and exterior cladding. The positioning brackets 14 may optionally work in tandem with an alignment sleeve 40 to maintain the hole alignment between the framing and exterior opening so that when the box 4, bezel 11, and door 5 are installed, the holes line up and the unit can be installed. The alignment sleeve 40 may function much like positioning brackets for speakers to designate where the speaker should be positioned to connect to existing wiring after sheetrock is installed but before final installation of the speakers. The alignment sleeve 40 may be construction related and a temporary issue for final installation, unlike the positioning brackets 14, which may be permanent. Alternately, the alignment sleeve 40 and positioning brackets 14 may be used in concert with each other and thus may both be permanent.

The positioning brackets 14 may each be a flat plate with a bend, such as a 90-degree bend, as shown. Each positioning bracket 14 may have one or more channels 15. The channels 15 may each be longer than 5 inches, or any desired length. Each positioning bracket 14 may comprise two parts, as shown in FIGS. 26 through 32, with the bend on one part and the channels 15 in a separate part, with the two parts working in conjunction to form the positioning bracket 14. One positioning bracket 14 may attach to the right side panel 8 at a desired position along the channels 15 thereof, while another positioning bracket 14 may attach to the left side panel 9 at the same desired position along the channels 15 thereof. Alternately, the channels 15 may be located in the right side panel 8 and left side panel 9 instead of in the positioning brackets 14. The attachment of each positioning bracket 14 may be via a plurality of removable attachment devices 16, such as screws, as shown, or other desired attachment devices. As such, the box 4 may be slidably positioned as desired along the channels 15. Stated another way, if the positioning brackets 14 are secured to the framing of a house or other structure, the box 4 may be positioned as desired by sliding the box 4 forward or backward relative to the positioning brackets 14 before securing the box 4 in place by tightening the attachment devices 16. This may allow the horizontal depth of the box 4 to be adjusted so the bezel 11 and door 5 are flat with or have a small reveal relative to the finished wall of the building.

The removable attachment devices 16 may be spring loaded or pressure forced bolts or pins that push though the groove in the bracket 14 and into the side panels of the box 4. The bolts or pins may be anchored in the box 4 by a nut or some type of locking cap and gasket.

The bend edge of each of the brackets 14 may attach to the vertical studs of the structure with conventional screws or nails, or any other desired attachment device.

For the builder/developer, a separate positioning sleeve 40 may be used to maintain the alignment in the openings created in the framing to secure the box 4 that is connected to the adjustable brackets 14 and the future hole in the exterior (whether siding, rock, brick, or some other cladding) so the alignment of both holes (in the framing and exterior) is maintained for future final installation. This may allow the box 4 to be removed during construction to minimize potential damage to the box 4 during construction but still allows the box 4 to be reinserted back in the framing during final installation, much like many other appliances that require final installation after construction is completed. This positioning sleeve 40 may be made of a rigid but light gauge material such as plastic or metal and may be slightly larger than the parcel safe box 4 for shipping and installation purposes. The positioning sleeve 40 may optional have horizontal channels 41 that allow the bolts from the inside of the box 4 to be received by the adjustable brackets 14 to secure the box 4.

The box 4 may have a back panel 18 and/or back door 5. If a back door 5 is included, it may allow access to the interior of the parcel safe 2 from inside the house or other structure.

The box 4 may be capable of being mounted outside or separate from a house or other structure as a stand-alone unit. When used as a stand-alone unit, the box 4 may attach via a pedestal (not shown) with a quick release mounting system (not shown) to new or existing concrete, sturdy flooring material, or various elevated structures for convenient access.

Optionally, the door 5 and bezel 11 may be used without the box 4. When used without the box 4, the bezel 11 may install directly to the wall of the house or other structure, and may provide access directly to a room or sealed cavity in the house or other structure. In some number of cases, just the bezel 11 and external door 5 may open to a smaller pull-action door so that packages can be dropped into the home, garage, or external wall without a receiving box 4 penetrating the interior. Such a configuration may limit the risk of physical access from the outside, similar to a mailbox or package receptacle that limits access to the interior but allows the box or package to drop inside.

The door 5 may attach to the bezel 11 via hinges 21, which may be quick release hinges that may allow the door to be removed by the owner without using tools or a third-party serviceperson. The door 5 may thus be capable of being easily removed and replaced separately from the bezel 11 and/or the box 4 in case of computer failure or damage caused by attempted theft, as the bezel 11 and the box 4 are much less likely to be damaged and need replacing. The quick release hinges 21 may be positioned such that they are accessible only when the door 5 is open. Most of the electrical components of the parcel safe 2 described below may be mounted to the door 5 or to the bezel 11 and door 5, with plug and play features for ease of use and replacement and flexibility with future upgrades and service/maintenance. This may allow the owner to exchange the door 5 if an upgraded version is desired or replace the door 5 or components if they are damaged. For example, the computer and barcode scanner may be mounted to or housed within the door, while the rest of the electrical components, such as lights, monitor, speaker, etc., are in the bezel. In another example, just the barcode scanner may be in the door, with the remaining electrical components in the bezel. The door 5 may have a seal (not shown) against water entry. The seal may be an elastomeric compression seal. The door 5 and bezel 11 may have a vibration sensor to help detect possible entry or damage caused by attempted theft, tripping an audible and electronic alarm. The alarm may be through an existing alarm or through a mobile application.

A universal door jamb 43 may fit within the bezel 11, allowing the customer to optimize the positioning of the parcel safe 2 by selecting which side of the parcel safe 2, right or left, the door 5 is hinged for easy access. Such a universal door jamb 43 may also improve door 5 operability by reducing stacked tolerances caused by multiple bends and placement slots for connectors and components and allow for latch 22 repair or replacement.

The door 5 may be held in a closed position relative to the bezel 11 by a latch 22, which may be an electrically actuated mechanism or any other desired latch. For example, the door 5 may be closed with manual force to latch the pin 23 of the latch 22. A computer 24 in the door 5 may control the latch pin 23. The door 5 may open if a valid package is seen or if the customer opens the door 5 using a cell phone with Bluetooth. The door 5 may additionally be equipped with a motor (not shown) capable of finishing the closing action so that the user does not have to force the door 5 against the seal. This may be similar to automobile trunks that close themselves if the trunk is close to the latch.

The computer 24 in the door may be in communication with and control a variety of additional plug and play components, which may include, but are not limited to: a door closed sensor 25; audible output 26; a motion detector 27; one or more cameras 28; one or more lights 29; a battery 30; an AC power, solar power, or wind power connection 31; a Bluetooth antenna 32; a Wi-Fi antenna 33; a Zigbee or similar IoT communication system; a speaker and microphone for two-way communication; a motor to latch the door; any other desired component or components; or any combination thereof.

The door closed sensor 25, which may be a switch or any other desired sensor, may be used to verify the door 5 is closed. This may allow the system 1 to sound an alarm if the door 5 is forced open or left open by a delivery person.

The system 1 may provide audible feedback to the user via the audible output 26. The audible output 26 may be a speaker, an alarm, any other desired audible output, or any combination thereof. For example, an alarm may sound if the door 5 is left open or not closed correctly; a sound may indicate that the bar code was not accepted; a sound may indicate that the bar code could not be read; and a sound may indicate that the unit has been broken into or a violent impact occurs.

A motion detector 27, such as a passive infrared motion detector, FR proximity sensor, or low power radar, may be used to detect the presence of a person near the parcel safe 2. The system 1 may send pictures or video to the server 3 for temporary archiving and start the process of looking for a valid bar code on a package. This may serve two main purposes: to save power because the bar code reader only operates when someone is near the parcel safe 2 and to begin recording video for security purposes. The system 1 may additionally incorporate a spotlight to provide light for the video recording. The system 1 may upload security video of motion near and around the parcel safe 2 at any time of day or night.

A primary camera 28 may be used for reading package bar codes and recording activity in the immediate area around the front of the parcel safe 2. The primary camera 28 may be capable of reading 1D, 2D, and/or QR codes on packages. A light 29 may be located next to the camera 28 to allow the camera to operate in low light conditions. The light 29 may be a simple white LED light or any other desired light. The light 29 may become active during bar code scanning to help the user position the package for scanning. A blinking light 29 may also be used to indicate conditions like an unrecognized bar code. The system 1 may be capable of archiving video recordings, such as for 5 to 120 days. Additionally or alternately, the system 1 may have a secondary sensor for reading bar codes and QR codes beyond the primary camera 28.

The system 1 may optionally also comprise one or more additional cameras 28, which may be incorporated into a doorbell to notify homeowners that someone is at the door as well as to record activity around the parcel safe 2 and/or included inside the box 4 to record what has actually been delivered. This option may be plug and play. Future additions may include two-way verbal communication, which may be triggered by ringing the doorbell or any type of alarm warning.

The computer 24 may be a small single board computer with an ARM processor running Linux, or any other desired computer. The board may have a voltage regulator, ethernet interface, Wi-Fi interface, Bluetooth interface, digital inputs and outputs, and digital output with power drive for the latch 22. The computer 24 may have custom software to: interface with iPhones and Android phones via Bluetooth; interface with the camera 28 to read bar codes; interface with the motion detector 27; interface with the door closed sensor 25; interface with the door latch 22; interface with wireless router to gain access to the internet; interface with the light 29; interface with the internal battery 30; interface with an external power source via the AC power connection 31; and/or interface with a Zigbee or similar IoT communication system.

The internal battery 30 may be included to power the system 1 so that the owner can open the parcel safe 2 when external power is off. If the parcel safe 2 is stand-alone unit, the system 1 may include a second battery 30 to power the system 1 between charges if external power is not available. This option may be plug and play.

If an external power source is available, the system 1 may be powered by the external power source, such as 115 VAC power mains. The AC power connection 31 may be plug and play and may be a direct connection to the house grid or a plug that connects to a receptacle. The system 1 may use 12 VDC, in which case the AC power connection 31 may comprise a UL rate, wall mounted AD/DC converter, which may be used to generate the 12 VDC. Additionally or alternately, an alternate power source, such as a solar power or a small wind power generator may be connected by an appropriate-size cable to the system 1.

The Bluetooth antenna 32 may be a small, flat antenna. The Bluetooth antenna 32 may be mounted outside the box 4 if the box 4 is made of metal, or either inside or outside the box 4 if the box is nonconductive, such as if the box 4 is made of plastic. The Wi-Fi antenna 33, which may be an 802.11 type or any other desired Wi-Fi antenna, may be mounted outside the box 4 to communicate with the wireless router in the house or other structure. Either or both of the antennas 32 and 33 may be protected by an antenna protection shroud after installation from damage during and after construction.

The system 1 may have an ethernet connection, either plugged in to the home or other structure or remote. A wired ethernet connection may provide POE (power over ethernet) to network and power the parcel safe 2.

The parcel safe 2 may be constructed of any desired material or combination of materials. For example, when intended for installation within the framing of a house or other structure, the box 4 may be constructed of heavy plastic or thin sheet metal, while the bezel 11 and door 5 may be a heavier gauge powder-coated metal. When intended for use as a stand-alone unit, the box 4 may likewise be constructed of heavier gauge power-coated metal.

The parcel safe system 1 may optionally comprise a quick release USPO mailbox, which may be capable of being attached to the top of the parcel safe 2 for owners that want to combine the parcel safe 2 with a USPO approved mailbox configuration in one location.

Other features of the parcel safe system 1 may include integration with new or existing alarm and security features of the home or other structure; an insulated box 4; on-board cooling/refrigeration of the box 4 for perishables; remote temperature control via a mobile app; all data and mobile controls integrated into various existing and new third-party smart home technology products; multi-unit configurations for duplexes and multi-family configurations; separate door 5 and bezel 11 products, separate from the box 4, for door-jamb installation in homes or flat surface installation, such as side wall, doors (front, side, or back), garage doors, garage walls, etc.; and commercial parcel safe systems 1 for small businesses, integrable into security systems.

The system 1 may allow the user to access the system 1 through a phone 34, via Bluetooth, to initially set the interface to the home internet router 35. The user may need to have a wireless router 35 to connect the parcel safe 2, via Wi-Fi, to the internet, as well as a connection 36 to the internet to allow the parcel safe 2 to communicate with the server 3. The system 1 may also allow the user's phone to communicate with the server 3 to check the status, monitor deliveries, etc. using a mobile application 37. The mobile application 37 may be available for iOS and/or Android systems, and may provide third-party advertising, customer interface with the server 3, package delivery information, subscriber usage data, subscription sign-up and renewal, credit card data, web interface, etc. Specifically, the mobile application 37 may allow the user to let someone into the parcel safe 2 remotely, provide notification when the door 5 is left open, provide notification that a package has been received, provide a picture of the package dropped inside, and other capabilities. Additionally or alternately, the system 1 may comprise a key fob to remotely open the door 5 without having to open the mobile application 37.

The server 3 may be remotely located and secure, and may be connected to the internet. The server 3 may perform several main tasks: communicate with shipping companies via an interface 38 to find out what packages are out for delivery to each parcel safe 2 location; transfer the package information to each parcel safe 2 location; interface with user phones 34 for status and commands; and allow administrative access 39 to maintain accounts, transfer and update billing information, archive security video, track third-party advertising data/clicks/etc., provide web hosting, and allow other administrative functions.

The quick release features of the system 1 may allow the user to easily repair, change, and reconfigure the system 1. The modular design may allow the user to choose, service, and change major parcel safe 2 components. Most of the components may be plug-and-play, allowing flexibility to add existing or new features now and in the future to best fit changing needs and price points. The system 1 may integrate flexibly with other smart home technologies. The mobile software app/interface may bring the entire flexible system 1 under the control of the user.

The system 1 may keep packages delivered to the home safe from theft. It may allow secure delivery of packages without the necessity of a signature for delivery. The system 1 may allow the user to receive packages without the inconvenience of asking neighbors to retrieve the packages or have the packages delivered to another location. It lowers costs of stolen packages for both the user and the sender. If the box 1 is insulated and/or refrigerated, the system 1 may allow the user to receive food and prescriptions in a temperature-controlled environment remotely for ease of use and energy conservation. The system 1 may allow limited access, controlled by the user.

The system 1 may include a crash door or other emergency release mechanism 44 inside the parcel safe 2 in case a small child is inside so that the child can push the door open. Specifically, the emergency release mechanism 44 may allow a small child trapped in the enclosure to open the door by consciously or inadvertently pressing or pushing a long vertical release arm located on either side. The emergency release mechanism 44 may be easily accessible in an emergency. The system 1 may additionally incorporate a mechanical lock 45, keypad 42, or similar mechanical device to allow the owner to open the parcel safe 2 if the power is out and the battery is drained. If a keypad 42 is incorporated, the keypad 42 may be electronic. This may allow for delivery access in case delivery barcode information is not available. The keypad 42 may allow for multiple combinations with separate combinations for each delivery company. The keypad 42 may also add additional convenience for the homeowner if the key-fob, key for the manual lock 45, and mobile application 37 are not readily available to open the door 5.

The system 1 may be capable of remote diagnostics and troubleshooting. This may add convenience for the homeowner to reduce the time and number of calls required to address an issue and to assist in correctly diagnosing operational issues and how to fix the problem. Furthermore, the system 1 may be capable of allowing features to be turned on and off remotely, depending on subscription elections. This may allow the customer to change features depending on the capabilities that best match the homeowner's current situation.

The system 1 may be capable of receiving speech recognition commands. These capabilities may allow a deliver company and homeowners to verbally direct the parcel safe 2 to accept a keypad 42 entry code to open the door 5, initiate two-way communication between the user and homeowner, leave a message for the homeowner, turn off the alarm of the parcel safe 2, etc.

Whereas, the devices and methods have been described in relation to the drawings and claims, it should be understood that other and further modifications, apart from those shown or suggested herein, may be made within the spirit and scope of this invention.

What is claimed is:

1. A system comprising:
   a parcel safe; and
   a server,
   where the parcel safe comprises:
   a computer configured to communicate, via a network, with the server;
   a bezel;
   a door, where the door connects to the bezel via hinges; and
   a latch.

2. The system of claim 1 where the hinges are quick release hinges.

3. The system of claim 1 further comprising at least one positioning bracket, where the positioning bracket is capable of being mounted to framing of a structure and the bezel is capable of adjustably mounting to the positioning bracket such that the bezel is capable of being installed at an adjustable depth relative to the framing and exterior cladding.

4. The system of claim 3 where each positioning bracket comprises at least one horizontal channel and each positioning bracket attaches to one side of the bezel at the channel via at least one attachment device, such that the bezel is capable of sliding forward or backward along the channels relative to the positioning bracket when the attachment devices are not secured and being secured in place in the desired position by the attachment devices.

5. The system of claim 1 where the computer is equipped with speech recognition software such that the system is capable of accepting verbal commands.

6. The system of claim 1 where the computer is capable of providing diagnostic information to the server such that the server is capable of providing remote diagnostics and troubleshooting.

7. The system of claim 1 where the parcel safe further comprises one or more features and where the computer is capable of toggling each of the features on and off at the direction of commands communicated remotely via the server.

8. The system of claim 1 where the bezel has a right side and a left side and where the parcel safe further comprises a universal door jamb such that the bezel is capable of accepting the hinges on either the right side or the left side.

9. The system of claim 1 further comprising an emergency door release.

10. The system of claim 1 further comprising an electronic keypad.

11. The system of claim 1 further comprising a manual keylock.

* * * * *